US011567936B1

(12) United States Patent
Jindal et al.

(10) Patent No.: US 11,567,936 B1
(45) Date of Patent: Jan. 31, 2023

(54) PLATFORM AGNOSTIC QUERY ACCELERATION

(71) Applicant: Keebo Inc., Ypsilanti, MI (US)

(72) Inventors: Alekh Jindal, Sammamish, WA (US); Barzan Mozafari, Ypsilanti, MI (US); Yongjoo Park, Champaign, IL (US); Brian Westphal, Ypsilanti, MI (US); Shi Qiao, Mercer Island, WA (US); Matthew Larsen, Menlo Park, CA (US); Advait Abhay Dixit, Sunnyvale, CA (US)

(73) Assignee: Keebo Inc., Ypsilanti, MI (US)

( * ) Notice: Subject to any disclaimer, the term of this patent is extended or adjusted under 35 U.S.C. 154(b) by 0 days.

(21) Appl. No.: 17/947,595

(22) Filed: Sep. 19, 2022

(51) Int. Cl.
*G06F 16/2453* (2019.01)

(52) U.S. Cl.
CPC .. *G06F 16/24542* (2019.01); *G06F 16/24539* (2019.01)

(58) Field of Classification Search
None
See application file for complete search history.

(56) References Cited

U.S. PATENT DOCUMENTS

| 7,440,963 | B1 | 10/2008 | Bello et al. |
| 8,103,689 | B2 | 1/2012 | Gupta et al. |
| 10,176,222 | B2 | 1/2019 | Schneider et al. |
| 10,726,014 | B2 | 7/2020 | Jindal et al. |
| 2015/0254294 | A1* | 9/2015 | Marais ............... G06F 16/275 707/690 |
| 2015/0347945 | A1* | 12/2015 | Reese ............. G06Q 10/06395 705/7.23 |
| 2018/0052708 | A1* | 2/2018 | Ganesan .............. G06F 9/4812 |
| 2019/0005176 | A1* | 1/2019 | Illikkal ................ G06F 3/0628 |
| 2019/0147092 | A1* | 5/2019 | Pal ....................... H04L 67/125 707/713 |
| 2019/0324964 | A1* | 10/2019 | Shiran ................ G06F 16/2228 |
| 2021/0089532 | A1 | 3/2021 | Patel et al. |
| 2021/0216547 | A1* | 7/2021 | Cisek ............... G06F 16/24537 |

(Continued)

FOREIGN PATENT DOCUMENTS

| EP | 2672397 A1 | 12/2013 |
| WO | 2020086832 A1 | 4/2020 |

*Primary Examiner* — Christopher J Raab
(74) *Attorney, Agent, or Firm* — Yantra Patents LLC; Anand P Narayan

(57) ABSTRACT

Implementations described herein relate to systems and methods to provide platform agnostic query acceleration. In some implementations, a method includes receiving, at a processor associated with a query acceleration service, a request from an client/application, wherein the request conforms to a particular wire protocol of a plurality of supported wire protocols, and wherein the request includes header data and body content data, analyzing the request to identify at least one of a query and a command in the body content data, determining an optimal matched model of the one or more query acceleration models, rewriting the query based on the optimal matched model, transmitting the rewritten query to the query processing platform, receiving a response to the rewritten query or the query from the query processing platform, and transmitting the received response to the application, wherein the transmission is configured based on the particular wire protocol.

20 Claims, 16 Drawing Sheets

(56) References Cited

U.S. PATENT DOCUMENTS

2021/0240695 A1    8/2021   Cruanes et al.
2022/0027368 A1    1/2022   Muralidhar et al.
2022/0100760 A1*   3/2022   De Santis ........... G06F 12/0238

* cited by examiner

310

| Order Number | Timestamp | Order Amount |
|---|---|---|
| 1 | 8/10/2022 10:44am | 145.00 |
| 2 | 8/10/2022 10:54am | 220.00 |
| 3 | 8/10/2022 3:23pm | 13.95 |
| 4 | 8/11/2022 10:05am | 127.87 |
| 5 | 8/11/2022 11:33pm | 255.13 |
| 6 | 8/12/2022 9:05am | 139.76 |
| 7 | 8/13/2022 11:15am | 57.88 |
| 8 | 8/17/2022 3:45pm | 345.65 |
| 9 | 8/18/2022 10:15am | 123.55 |
| 10 | 8/18/2022 1:15pm | 78.34 |

340

| Day | Number of orders | Total order amount |
|---|---|---|
| 8/10/2022 | 3 | 378.95 |
| 8/11/2022 | 2 | 383.00 |
| 8/12/2022 | 1 | 139.76 |
| 8/13/2022 | 1 | 57.88 |
| 8/17/2022 | 1 | 345.65 |
| 8/18/2022 | 2 | 201.89 |

360

| Week | Number of orders | Total order amount |
|---|---|---|
| 8/9/2022 - 8/16/2022 | 7 | 959.59 |
| 8/17/2022-8/24/2022 | 3 | 547.54 |

POST /queries/v1/query-request?requestId=xxxx&request_guid=xxxx HTTP/1.1
content-encoding: gzip
accept: application/snowflake
Authorization: Snowflake Token="xxxx"
Content-Length: 209
Content-Type: application/json
Host: xxxx.us-east-1.snowflakecomputing.com:4431
Connection: Keep-Alive
User-Agent: JDBC/3.12.8 (Linux 4.15.0-1050-aws) JAVA/1.8.0_232-ea
Accept-Encoding: gzip,deflate

490

* Body Content Data ( Encoded Bytes ) *

Query-1:

WITH order_items AS (select o_orderkey, o_custkey, O_TOTALPRICE, O_ORDERDATE from Orders)
SELECT
   AVG(( order_items."O_TOTALPRICE" ) ) AS
"order_items.average_sale_price"
FROM order_items
WHERE ((( DATEADD('year', 1, order_items."O_ORDERDATE") ) >= ((DATEADD('day', -124, CURRENT_DATE())))) AND ( DATEADD('year', 1, order_items."O_ORDERDATE") ) < ((DATEADD('day', 125, DATEADD('day', -124, CURRENT_DATE()))))))
FETCH NEXT 500 ROWS ONLY

850

Query-2:

WITH order_items AS (select
      o_orderkey,
      o_custkey,
      o_totalprice,
      dateadd(year, 23, o_orderdate) O_ORDERDATE
       from orders
      )
SELECT COUNT(*) AS "order_items.high_price_orders_count" FROM orders
WHERE o_totalprice > (SELECT
 AVG((order_items."O_TOTALPRICE")) AS
"order_items.average_sale_price"
FROM
 order_items
WHERE
 (((DATEADD('year', 1, order_items."O_ORDERDATE")) >= ((DATEADD('day', -99, CURRENT_DATE())))) AND (DATEADD('year', 1, order_items."O_ORDERDATE")) < ((DATEADD('day', 100, DATEADD('day', -99, CURRENT_DATE()))))))
AND
 (((DATEADD('year', 1, order_items."O_ORDERDATE")) >= ((DATEADD('day', -99, CURRENT_DATE())))) AND (DATEADD('year', 1, order_items."O_ORDERDATE")) < ((DATEADD('day', 100, DATEADD('day', -99, CURRENT_DATE()))))))
FETCH NEXT 500 ROWS ONLY

FIG. 8

910 → Rewritten Query-1:

select sum("KEEBO_MEASURE.SUM.O_TOTALPRICE") / sum("KEEBO_MEASURE.COUNT.O_TOTALPRICE") as "order_items.average_sale_price" from KEEBO_TEST.KEEBO.keebo_summary where (dateadd('year', 1, "KEEBO_DIM.BASECOL_BY_DAY.O_ORDERDATE") >= dateadd('day', -124, current_date())) and (dateadd('year', 1, "KEEBO_DIM.BASECOL_BY_DAY.O_ORDERDATE") < dateadd('day', 125, dateadd('day', -124, current_date()))) fetch NEXT 500 ROWS only 950 → Rewritten Query-2:

SELECT COUNT(*) AS "order_items.high_price_orders_count" FROM orders
WHERE o_totalprice > (select
  sum("KEEBO_MEASURE.SUM.O_TOTALPRICE") / sum("KEEBO_MEASURE.COUNT.O_TOTALPRICE") as "order_items.average_sale_price"
from
  KEEBO_TEST.KEEBO.keebo_summary
where
  (((DATEADD('year', 1, order_items."O_ORDERDATE")) >= ((DATEADD('day', -99, CURRENT_DATE()))) AND (DATEADD('year', 1, order_items."O_ORDERDATE")) < ((DATEADD('day', 100, DATEADD('day', -99, CURRENT_DATE()))))))
AND
  (((DATEADD('year', 1, order_items."O_ORDERDATE")) >= ((DATEADD('day', -99, CURRENT_DATE()))) AND (DATEADD('year', 1, order_items."O_ORDERDATE")) < ((DATEADD('day', 100, DATEADD('day', -99, CURRENT_DATE()))))))
FETCH NEXT 500 ROWS ONLY

FIG. 9

PLATFORM AGNOSTIC QUERY ACCELERATION

TECHNICAL FIELD

Embodiments relate generally to query acceleration, and specifically, to a platform agnostic query acceleration service.

BACKGROUND

Query optimization has traditionally been deeply embedded within query processing platforms. Users and applications send their queries, e.g., SQL queries, to the query processing platform which picks the best execution plan for each query. To improve the query performance, platforms need to change their query optimizers to produce better query plans, e.g., by rewriting queries to access data more efficiently, using more efficient query operators, employing more efficient data distribution, indexes (indices), sort orders, applying more efficient resource allocation, etc.

However, query processing platforms are typically built for a wide range of users and varied workloads, and therefore the in-built query optimizations are designed to work for the general case. For instance, if a business intelligence dashboard sends SQL queries with a particular pattern, then specialized data models that are optimized for that pattern could help achieve better performance. Query processing platforms do not perform such optimization since their goal is to support arbitrary users and applications, thus leaving significant performance on the table.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method. The computer-implemented method also includes receiving, at a processor associated with a query acceleration service, a request from an application, where the request conforms to a particular wire protocol of a plurality of supported wire protocols, and where the request includes header data and body content data; analyzing the request to extract the body content data, where the analyzing may include decoding the request; determining, based on the body content data whether the request is to be bypassed or whether the request includes a query to be processed; if it is determined that the request is to be bypassed: transmitting the request to a query processing platform. The method also includes receiving a response from the query processing platform; and transmitting the received response to the application. The method also includes if it is determined that the request includes the query to be processed: determining whether the query matches one or more query acceleration models; if it is determined that the query matches the one or more query acceleration models: determining an optimal matched model of the one or more query acceleration models; rewriting the query based on the optimal matched model to generate a rewritten query; and transmitting the rewritten query to the query processing platform; and if it is determined the query does not match the one or more query acceleration models: transmitting the query to the query processing platform; receiving a response to the rewritten query or the query from the query processing platform; and transmitting the received response to the application, where the transmission is configured based on the particular wire protocol. Other embodiments of this aspect include corresponding computer systems, apparatus, and computer programs recorded on one or more computer storage devices, each configured to perform the actions of the methods.

Implementations may include one or more of the following features. The computer-implemented method may include: converting the query to a common query plan representation; and selecting the one or more query acceleration models from a data store based on a search performed on the data store by utilizing the converted query. The one or more query acceleration models meet a data freshness threshold, and where the data freshness threshold associated with the query is determined based on one or more of a user group, application, and user identifier associated with the request. Selecting the one or more query acceleration models further may include selecting the one or more query acceleration models that meet a threshold success criterion. Determining whether the query matches the one or more query acceleration models may include determining whether the one or more query acceleration models at least partially satisfies a logical containment criterion with respect to the query. The one or more query acceleration models completely satisfies the logical containment criterion with respect to the query, and where the rewriting the query may include rewriting the query such that the rewritten query accesses one or more precomputed tables stored at the query processing platform and does not access a base table at the query processing platform. The one or more query acceleration models partially satisfies a logical containment criterion with respect to the query, and where the rewriting the query may include rewriting the query such that the rewritten query accesses at least one precomputed table and accesses at least one column of a base table at the query processing platform. The computer-implemented method may include storing the received response in a specialized data structure associated with the query acceleration service. The query does not match the one or more query acceleration models and where the method further may include: calculating a score associated with the query based on one or more processing parameters associated with the query; and based on the score meeting a threshold predetermined model generation score, constructing a new model based on a data tree derived from the query; and adding the new model to the one or more query acceleration models. The computer-implemented method may include: determining a completion time of data ingestion for tables associated with each of the one or more query acceleration models; and updating the corresponding query acceleration model subsequent to the completion time of data ingestion for the tables. The one or more query acceleration models may include a derived computation from one or more base tables, and where the one or more query acceleration models further may include summaries of tables, materialized views of tables, joined tables, group bys, and combinations thereof. Determining the optimal matched model may include: enumerating the one or more query acceleration models; and determining the optimal matched model based on a rule based criterion or a cost based criterion. The computer-implemented method may include: determining, at a user specified interval, whether a freshness level of each model of the one or more query acceleration models meets a corresponding threshold freshness; based on a determination that the freshness level of the each model does not meet the corresponding threshold freshness, determining whether an update budget associated with the each model is available; and based on a determination that the update budget associated with the each model is available, updating the each model. Implementations of the described techniques may include hardware, a method or process, or computer software on a computer-accessible medium.

The non-transitory computer-readable medium also includes receiving, at a processor associated with a query acceleration service, a request from an application, where the request conforms to a particular wire protocol of a plurality of supported wire protocols, and where the request includes header data and body content data; analyzing the request to identify at least one of a query and a command in the body content data, where the analyzing may include decoding the request; determining, based on the body content data whether the request is to be bypassed or whether the request includes a query to be processed; if it is determined that the request is to be bypassed: transmitting the request to a query processing platform. The medium also includes receiving a response from the query processing platform; and transmitting the received response to the application. The medium also includes if it is determined that the request includes the query to be processed: determining whether the query matches one or more query acceleration models; if it is determined that the query matches the one or more query acceleration models: selecting an optimal matched model of the one or more query acceleration models; rewriting the query based on the optimal matched model to generate a rewritten query; and transmitting the rewritten query to the query processing platform; and if it is determined the query does not match the one or more query acceleration models: transmitting the query to the query processing platform; receiving a response to the rewritten query or the query from the query processing platform; and transmitting the received response to the application, where the transmission is configured based on the particular wire protocol. Other embodiments of this aspect include corresponding computer systems, apparatus, and computer programs recorded on one or more computer storage devices, each configured to perform the actions of the methods.

Implementations may include one or more of the following features. The non-transitory computer-readable medium where determining whether the query matches the one or more query acceleration models may include determining whether the one or more query acceleration models at least partially satisfies a logical containment criterion with respect to the query. The one or more query acceleration models completely satisfies the logical containment criterion with respect to the query, and where the rewriting the query may include rewriting the query such that the rewritten query accesses one or more precomputed tables stored at the query processing platform and does not access a base table at the query processing platform. The one or more query acceleration models partially satisfies the logical containment criterion with respect to the query, and where the rewriting the query may include rewriting the query such that the rewritten query accesses at least one precomputed table and accesses at least one column of a base table. Implementations of the described techniques may include hardware, a method or process, or computer software on a computer-accessible medium.

The system also includes a memory with instructions stored thereon; and a processing device, coupled to the memory, the processing device configured to access the memory and execute the instructions, where the instructions cause the processing device to perform operations including: receiving, at a processor associated with a query acceleration service, a request from an application, where the request conforms to a particular wire protocol of a plurality of supported wire protocols, and where the request includes header data and body content data; decoding the request, using the header data to extract the body content data; determining, based on the body content data whether the request is to be bypassed or whether the request includes a query to be processed; if it is determined that the request is to be bypassed: transmitting the request to a query processing platform; receiving a response from the query processing platform; and transmitting the received response to the application. The system also includes if it is determined that the request includes the query to be processed: determining whether the query matches one or more query acceleration models; if it is determined that the query matches the one or more query acceleration models: determining an optimal matched model of the one or more query acceleration models; rewriting the query based on the optimal matched model to generate a rewritten query; and transmitting the rewritten query to the query processing platform; and if it is determined the query does not match the one or more query acceleration models: transmitting the query to the query processing platform; receiving a response to the rewritten query or the query from the query processing platform; and transmitting the received response to the application, where the transmission is configured based on the particular wire protocol. Other embodiments of this aspect include corresponding computer systems, apparatus, and computer programs recorded on one or more computer storage devices, each configured to perform the actions of the methods.

Implementations may include one or more of the following features. The system where determining the optimal matched model may include: enumerating the one or more query acceleration models; and determining the optimal matched model based on a rule based criterion or a cost based criterion. The one or more query acceleration models meet a data freshness threshold, and where the data freshness threshold associated with the query is determined based on one or more of a user group, application, and user identifier associated with the request. Implementations of the described techniques may include hardware, a method or process, or computer software on a computer-accessible medium.

BRIEF DESCRIPTION OF THE DRAWINGS

FIG. 3 depicts example base tables and summaries, in accordance with some implementations.

FIG. 4B depicts an example wire protocol request received at a listener associated with a platform agnostic query acceleration service, in accordance with some implementations.

FIG. 8 illustrates example queries, in accordance with some implementations.

FIG. 9 illustrates example rewritten queries, in accordance with some implementations.

DETAILED DESCRIPTION

Figure 1:
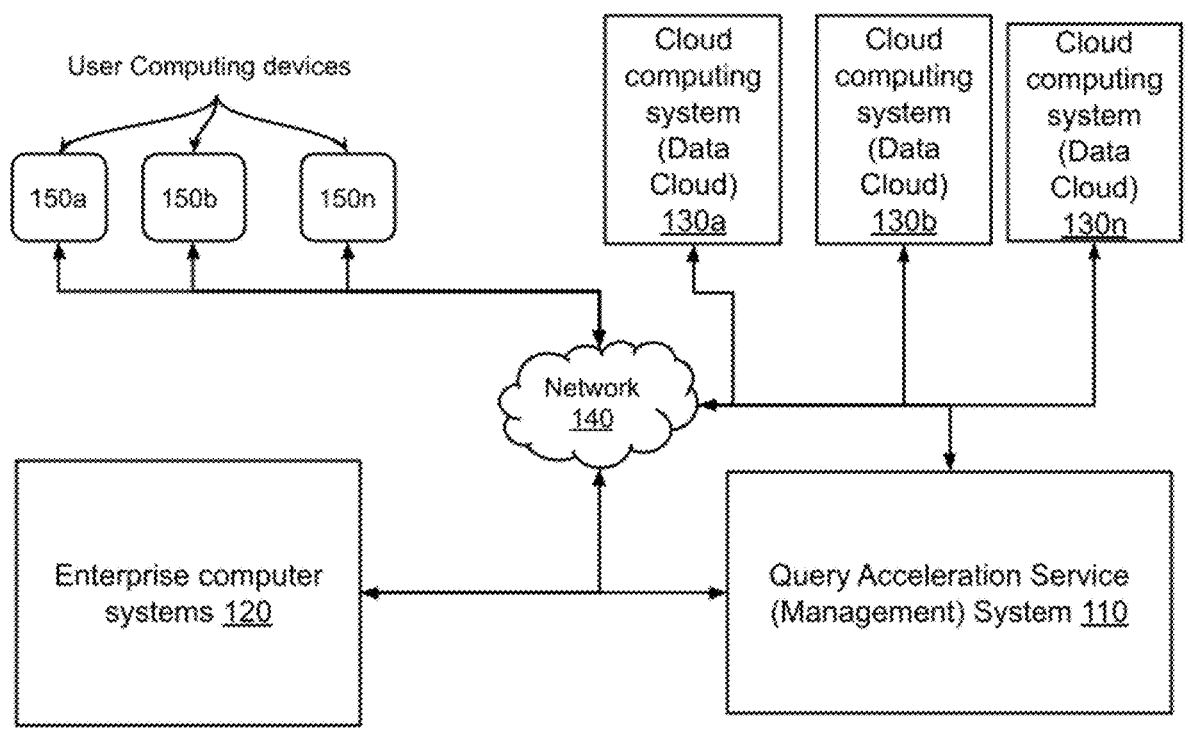
FIG. 1 depicts an example system environment, in accordance with some implementations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some embodiments", "an embodiment", "an example embodiment", etc. indicate that the embodiment described may include a particular feature, structure, or characteristic, but every embodiment may not necessarily include the particular feature, structure, or characteristic. Similarly, references in the specification to "some implementations", "an implementation", "an example implementation", etc. indicate that the implementation described may include a particular feature, structure, or characteristic, but every implementation may not necessarily include the particular feature, structure, or characteristic. Moreover, such phrases are not necessarily referring to the same embodiment or implementation. Further, when a particular feature, structure, or characteristic is described in connection with an embodiment, such feature, structure, or characteristic may be implemented in connection with other embodiments whether or not explicitly described.

Data warehouses, also referred to as enterprise data warehouses, are systems used for reporting and data analysis and considered to be a key component of business intelligence systems. Data warehouses serve as central repositories of integrated data from one or more disparate sources, e.g., transactional computer systems, customer relationship management (CRM) systems, enterprise resource planning (ERP) systems, etc., to store and provide access to current and historical data that are used for creating analytical reports for users (e.g. employees) throughout an enterprise.

The data stored in the warehouse is uploaded from the operational systems (such as marketing or sales). A data warehouse is a type of data management system that is designed to enable and support business intelligence (BI) activities, especially analytics. Data warehouses are extensively utilized to perform queries and analysis and often contain large amounts of historical data. The data within a data warehouse can be derived from a wide range of sources such as application log files and transaction applications. A typical data warehouse has four main components: a central database, ETL (extract, transform, load) tools, metadata, and access tools. A data warehouse centralizes and consolidates large amounts of data from multiple sources. Its analytical capabilities allow organizations to derive valuable business insights from their data to improve decision-making. A historical record is maintained that can be utilized by data scientists and business analysts.

Historically, data warehouses were built with on-premises ('on-prem') servers. These on-premises data warehouses continue to have advantages even today. In many cases, they can offer improved governance, security, data sovereignty, and better latency. However, on-premises data warehouses are not as elastic, and they require complex forecasting to determine how to scale the data warehouse for future needs. Managing these data warehouses can also be very complex.

However, more recently, the use of cloud data warehouses is becoming prevalent. A cloud data warehouse (virtual data warehouse) uses the cloud to ingest and store data from disparate data sources. Cloud data warehouses provide advantages such as increased elasticity, with scalability support for large or variable compute and/or storage requirements, cost savings, and ease of use.

Most cloud data warehouses are fully managed by a provider of a data warehouse system, (cloud data), are self-driving, and enable easy access to enable users to create and use the data warehouse. Most cloud data warehouses support and follow a pay-as-you-go model, which brings added cost savings to customers.

Business Intelligence (BI) applications (clients) and tools are commonly utilized by enterprises to access data in the cloud data warehouses, and transform the data stored in the data warehouses to actionable insights. The BI applications and/or tools utilize queries to access data of interest based on a user intent and purpose.

Query processing refers to a process by which queries are processed at a query processing platform in response to a received query. The query may be transmitted to a database or an information system via a network. Processing of the query may include multiple steps, for example, interpreting the query, searching through the space where the data associated with the query is stored, retrieving the results that satisfy the query, transmitting a response to the application or device where the query originated, etc.

Query processing can include extracting information and selected data from large datasets without actually changing the underlying database where the data are organized.

In some implementations, the query is posed using a high-level declarative language (e.g., SQL, My SQL, etc,) and the query processing platform transforms the query into an execution strategy. The processing may include query decomposition (analysis, conjunctive and disjunctive normalization, and semantic analysis), query optimization, and query evaluation (execution).

In order to improve the efficiency of query processing, query processing platforms commonly include optimizations that are designed to speed up query processing, e.g., generate faster responses, utilize less resources, etc.

In traditional implementations, the database administrator and/or other administrator associated with the query processing and the users generating the queries were part of the same enterprise. In such implementations, optimizations can be performed with relatively high awareness on the part of the database administrators regarding the queries—query types, query patterns, etc.

Increasingly though, business models have evolved whereby third-party query processing platforms provide query processing services to a set of users. This provides benefits to users and enterprises; for example, the enterprise need not maintain database infrastructure, services can be scaled up and down as needed, etc.

However, since the third-party query processing platforms serve a large set of diverse users, the query processing platform may not be configured to provide specialized optimization for particular users and user-cases.

A technical problem in the software and database arts is the specialized optimization of queries in systems involving third-party query processing platforms.

Even if the query processing platforms were to incorporate specialized optimizations, there is a combinatorial space of query processing platforms (e.g., data lakes, lake houses, data clouds, etc.) and applications (e.g., data pipelines, BI dashboards, reporting tools) that make such workload-specific specialization impossible, i.e., too many platforms will require too many deep query optimization changes.

To deal with this lack of specialization, a current practice is to use recommendation tools for analyzing workloads and identifying better optimization decisions. However, in many implementations, users may need to implement the recommendations, make relevant changes to their application code, and maintain those changes over time—a cumbersome and non-trivial task for fast changing modern data applications.

Techniques described in this disclosure enable platform agnostic query acceleration, i.e., any user application over any query processing platform may derive the benefit(s) of accelerated query processing performance seamlessly for ad hoc and analytical queries generated at the user application. The platform agnostic query acceleration handles transactional queries and other queries that may not be accelerated by passing such queries directly to the query processing platform as they were received, i.e., without any rewriting of the queries. The platform agnostic query acceleration may be provided as a query acceleration service.

Key elements of platform agnostic query acceleration are described below.

The platform agnostic query acceleration service implements multiple wire protocols at its endpoints to enable interoperability with multiple query processing platforms and multiple clients/applications. The platform acceleration service includes a listener that implements one or more wire protocols to receive transmitted messages configured per the wire protocol. For example, a wire protocol specified by any of one or more query processing platforms, e.g., Snowflake, Redshift, etc., may be implemented and enable a client or application to communicate with the query acceleration service using the same wire protocol that would have been used to communicate with a query processing platform.

An implementation of a wire protocol enables a listener at the platform agnostic query acceleration service to receive and interpret a set of commands and queries over a network.

When a message or request is transmitted from a client/application, it includes one or more of commands and queries that are written in a sequence of bytes, serialized, and optionally encoded and/or encrypted. A query processing platform and platform agnostic query acceleration service are wire-protocol compatible in the sense that they can receive and interpret the same sequence serialization, encoding, and/or encryption of the data.

Applications connect to a new endpoint, e.g., a http endpoint, without changing any of the client libraries. This enables users to connect to the query acceleration service with a relatively small change. Users can realize accelerated performance over existing data sources without any migration of their data.

In some implementations, applications can connect to a non-http endpoint. For example, an application may connect to the query acceleration service via a binary protocol supported by Postgres that emulates a connection to a Redshift endpoint. The query acceleration service may separately connect to Redshift via a non-http protocol, e.g., on port 5439.

The query acceleration service is provided as a middleware application that is communicatively coupled to clients/applications that originate the queries and to query processing platforms that process the queries and generate results.

In some implementations, the query processing platform can parse queries into a common query plan representation, analyze query plans to learn specialized models for better performance, create and maintain models subject to user budget and freshness guarantees, and rewrite queries using the specialized models for better performance.

In some implementations, the rewritten queries are transmitted to the query processing platform and the rewritten query can access the database and return results to client applications.

In some implementations, queries that do not match any of the specialized models can be passed through, and to bypass a query rewriting process. The query acceleration service can further refine and improve the specialized models based on the frequency of various query patterns, past performance, budget, and freshness guarantees.

FIG. 1 depicts an example system environment, in accordance with some implementations.

FIG. 1 depicts a query acceleration service system 110 that may be utilized to perform managed tuning in a data cloud environment. The query acceleration service system 110 is connected via network 140 to one or more data cloud (data warehouse) systems 130 that provide data warehousing and other allied services to one or more users, e.g., enterprise users. The data warehousing and other services, e.g., data integration, management, storage, analytics, etc., and may also be referred to as a DaaS (Data as a Service) system.

The query acceleration service system is communicatively coupled to one or more enterprise computer system(s) 120 and may provide services such as query acceleration for applications, e.g., business intelligence applications, utilized by the enterprise computer systems as well as their end-users.

Network 140 may be any network or combination of networks of computing devices that enable devices to communicate with one another. For example, network 140 can be any one or any combination of a LAN (local area network), WAN (wide area network), telephone network, wireless network, point-to-point network, star network, token ring network, hub network, or other appropriate configuration.

The computer systems may be connected using TCP/IP and use other common Internet protocols to communicate, such as HTTP, FTP, AFS, WAP, etc. Users may access the systems by utilizing different platforms and frameworks, e.g., by using single-page client applications that use HTML, and TypeScript.

One or more enterprise computer system(s) 120 represents computing devices associated with enterprise users who run applications over the network, e.g., data analytics, as well as users who may access the data cloud via respective user computing devices 150a-150n.

Both the cloud data warehouses (or the data cloud) and managed tuning are SaaS products, i.e, the users and enterprise applications (such as the business intelligence dashboards) can readily connect and start using them over the network (internet), without any local installation or setup.

Users can enable the configuration tuning system by creating user credentials, e.g., a user account that has relevant metadata access and that can be utilized to manage the tuning lifecycle and provide users with a suitable level of user access to query processing platform(s) and query acceleration service(s). Users may be enabled, via suitable user interfaces, to selectively apply managed tuning, e.g., control which warehouses have configuration tuning enabled, to specify a freshness tolerance threshold, etc. All data and query processing operations associated with the data warehouse may operate similarly to how they were functioning prior to activation of managed tuning.

Figure 2:
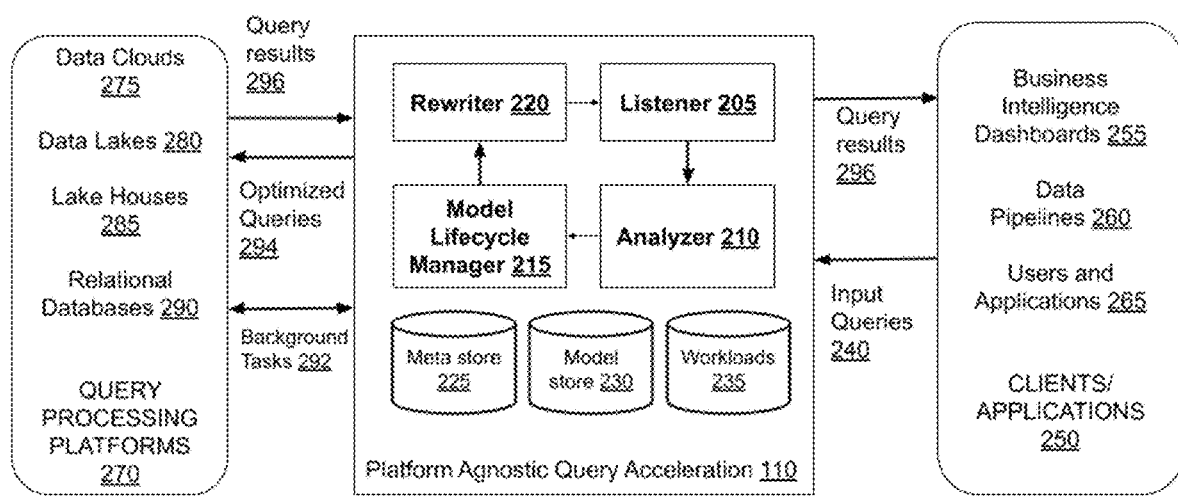
FIG. 2 depicts an example deployment environment of a platform agnostic query acceleration service, in accordance with some implementations.

FIG. 2 depicts an example deployment environment of a platform agnostic query acceleration service, in accordance with some implementations.

FIG. 2 depicts an example architecture of a platform agnostic query acceleration (PAQA) service 110 system. The service is provided as a middleware that operates between one or more clients 250 (BI dashboards, data pipelines, and other users and applications) and backend query processing platform(s) 270 (e.g., data clouds 275, data lakes 280, lake houses 285, or other relational databases 290 etc.).

The architecture of the platform agnostic query acceleration service includes a listener 205 to receive incoming input queries 240, an analyzer 210 to analyze those queries for acceleration opportunities, a model lifecycle manager 215 to create, update, and maintain specialized acceleration models, and a rewriter 220 to rewrite the queries using the specialized models before the rewritten (optimized) queries 294 are transmitted to the query processing platforms. The platform agnostic query acceleration service additionally includes components to provide a standalone, automatic, and self-operating service, e.g., a meta store 225, a model store 230, and a workload data store 235.

In some implementations, the platform agnostic query acceleration service maintains a record of input queries and their associated metadata for analysis, feedback, and continuous improvement. Summary statistics from the workload store may be presented to users of the platform agnostic query acceleration service via a dashboard. Workloads may be purged at regular intervals depending on storage costs, user requirements/constraints, etc.

The meta store keeps track of the models, their status, states, etc. The meta store is configured to be lightweight and enables fast querying in a live query path.

The model store is utilized to store the specialized models that could be physically materialized in the backend query processing platform or any other customer backend, e.g., data storage associated with the client/application.

Input queries 240 are received from clients/applications 250 and processed by the platform agnostic query acceleration service. The clients/applications may include business intelligence dashboards 255, data pipelines 260, users and applications 265, etc. Optimized (or in some cases, bypassed without optimization/acceleration) queries are transmitted to a query processing platform, which provides query results 296, which are transmitted by the platform agnostic query acceleration service to the clients/applications where the query was originally transmitted from.

The platform agnostic query acceleration service additionally performs background tasks 292, which may include updating of the models, generating summaries, etc.

The platform agnostic query acceleration service listener implements a wire protocol, the language utilized by clients to transmit commands and/or queries to a database. The protocol specifies a syntax for communication and is utilized by databases and clients to transmit data between one another. The wire protocol defines how to transmit (send) various types of queries and obtain (get) the results back. By implementing wire protocols at the listener, the platform agnostic query acceleration service listener enables seamless communication with clients since the clients and client applications remain unchanged and can use the same libraries that were previously utilized to communicate with one or more query processing platforms. The libraries may be utilized to communicate with the PAQA middleware instead, i.e., the middleware mimics the wire protocol of the query processing platforms for the purpose of query acceleration purposes.

The platform agnostic query acceleration service utilizes the same client libraries to transmit and receive messages to/from the backend query processing platform(s).

The architecture described herein for the platform agnostic query acceleration service provides several technical benefits and advantages. The data, e.g., base table data, being queried need not be migrated from their original location to provide the benefits of query acceleration. The data remains in the existing query processing platforms, i.e., no migration is required, and consequently poses a lower security risk.

The data ingestion pipelines into the query processing platforms remain unchanged. The client libraries and applications that are utilized to run and route queries to the query processing platform remain unchanged.

In some implementations, clients can continue querying the existing query processing platform endpoint. For example, a client application may be configured such that it can transmit queries directly to the query processing platform as well as additionally query an endpoint associated with the platform agnostic query acceleration service for accelerated performance.

The listener is lightweight, i.e., it does not add any noticeable overheads, and has sufficient failover nodes, i.e., it provides high availability.

Applications can include business intelligence tools (e.g., Looker, Tableau, Mode, Power BI, Hex, Sigma computing, etc.), interactive Notebooks (e.g., Jupyter, Databricks, or Synapse notebooks), other custom self-hosted dashboards that submit analytical queries to read and process one or more tables from backend databases (query processing platforms).

The client/applications may utilize an application execution environment, e.g., any software environment that supports execution of a software application. For example, an application execution environment supported herein may be an operating system (e.g., Linux, Windows, Unix, etc.), a hypervisor that supports execution of one or more virtual machines (e.g., Xen®, Oracle VM Server, Microsoft Hyper- V(™), VMWare® Workstation, VirtualBox®, etc.), a virtual computer defined by a specification, e.g., a Java Virtual Machine (JVM), an application execution container (e.g., containers based on Linux CGroups, Docker, Kubernetes, CoreOS, etc.), a process executing under an operating system (e.g., a UNIX process), etc. In some implementations, the application execution environment may be a software application, e.g., that is configured to execute on server hardware.

FIG. 3 depicts example base tables and summaries, in accordance with some implementations.

FIG. 3 depicts an illustrative example base table 310 that is a table of orders ('Orders'). The columns include a timestamp, e.g., when an order is received, and an order amount corresponding to the order.

FIG. 3 also depicts example summary table 340 and an example summary table 360, which include consolidated data. For example, summary table 340 is a summary table that includes consolidated orders organized on a daily basis. For example, the first row includes all orders received on 10 Aug. 2022, a second row includes all orders received on 11 Aug. 2022 and so on.

Similarly summary table 360 is a table that includes orders consolidated on a weekly basis. For example, the first row of data includes all orders received between the 9th of August and the 16th of August and the second row includes all orders received between 17 Aug. 2022 and 24 Aug. 2022.

Techniques for query acceleration can include utilization of materialized views and summaries. In this illustrative example, two simple examples of summaries are depicted.

The summaries can be utilized in order to accelerate queries. For example, consider the case of a business intelligence dashboard where an example user application transmits a request that includes a query to determine a total number of orders and a total amount of orders received for a particular period of time, e.g., between Aug. 10, 2022 and Aug. 12, 2022.

A non-accelerated query would access base table 310, obtain the included data elements, determine the total number of orders for the period and perform a sum operation of the order amounts to obtain the total number of orders and the total amount of orders.

However, the same results could also be obtained directly from summary table 340, which is a summary table (a specialized model/query acceleration model) generated from the base table, by simply summing corresponding rows in summary table 340. Utilizing the summary table involves fewer database operations (e.g., fetch operations, sum operations, etc.), and is an example of query acceleration.

For the same illustrative example, though, the results could not have been obtained from summary table 360, since summary table 360 includes data at the needed granularity.

However, if an example query was received to obtain a total order amount for a period from Aug. 10, 2022 and Aug. 24, 2022, an accelerated query may be constructed that simply references (accesses) summary table 360 and by summing the two rows in summary table 360. Utilizing summary table 360 involves fewer database operations (e.g., fetch operations, sum operations, etc.) when compared to utilizing summary table 340 or base table 310.

Figure 4A:
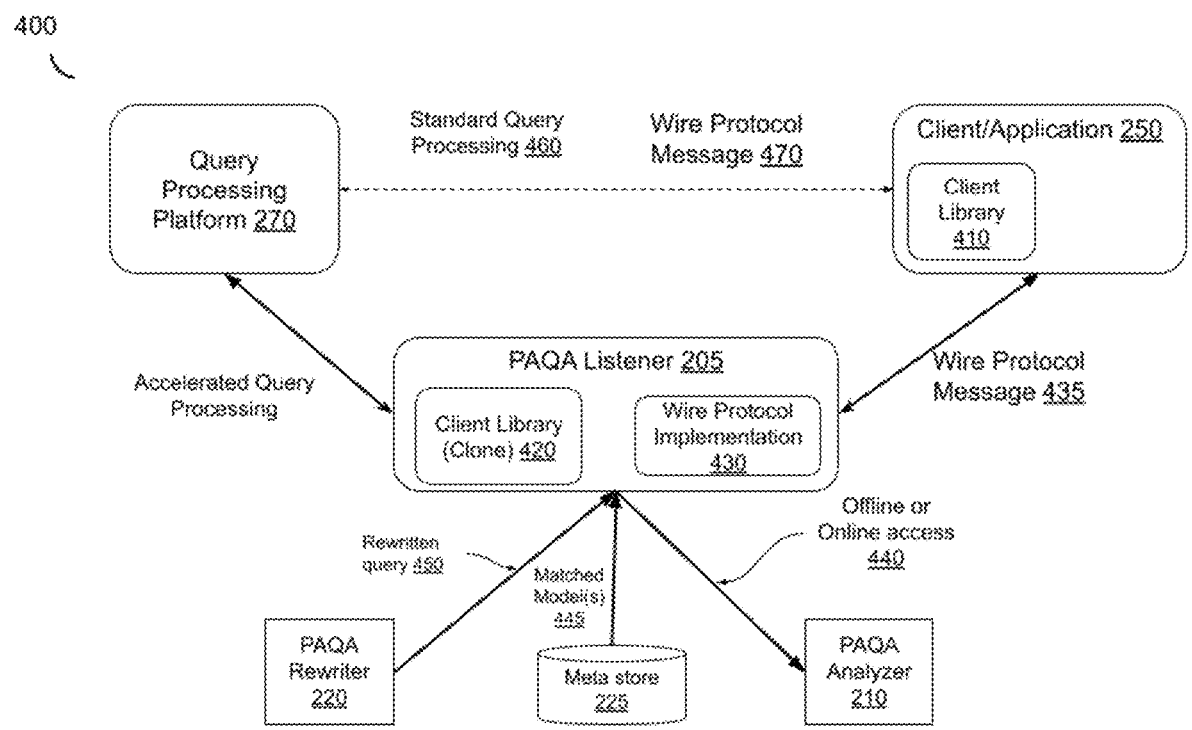
FIG. 4A is a schematic that depicts an example listener of a platform agnostic query acceleration service that is connected to a query processing platform and client applications, in accordance with some implementations.

FIG. 4A is a schematic that depicts an example listener of a platform agnostic query acceleration service that is connected to a query processing platform and client applications, in accordance with some implementations.

As depicted in FIG. 4A, the listener is configured such that it can communicate with the client/Application 250 as well as a query acceleration platform 270. The listener includes implementations of multiple wire protocols such that it can receive messages configured as per any of multiple supported wire protocols. The listener additionally includes client libraries that enable the listener to generate outbound message transmissions that are configured to conform to multiple supported wire protocols.

In some implementations, the platform agnostic query acceleration service listener may support multiple wire protocols provided by database vendors; examples include Type 4 JDBC, Oracle wire protocol, PostgreSQL wire protocol, MongoDB wire protocol, DataDirect, etc.

In some implementations, direct communication between the client/application and the query processing platform may also be supported, as depicted in FIG. 4A by a dashed line. As originally configured for standard query processing 460, the client/application generates a query that is then included in an 'original' wire protocol message 470 and transmitted to the query processing platform, which then generates a response per the wire protocol and in turn transmits a response message, also configured per the wire protocol.

Per techniques of this disclosure, the workflow is modified to enable query acceleration by utilizing a platform agnostic query acceleration service. Per the modified workflow, client libraries included in the client applications that are used to configure messages are configured to redirect requests to the PAQA listener endpoint. The request itself does not have to be modified in any way and may be identical to the message previously transmitted directly to the query acceleration platform. For example, in some implementations, the previously transmitted message is now transmitted to a PAQA listener endpoint, e.g., a http endpoint. The endpoint information is previously transmitted to the client/application during setup of the platform agnostic query acceleration service.

The listener mimics one or more query processing platform(s) by implementing a corresponding wire protocol (e.g., by implementing a particular query processing platform's own native wire protocol), and interprets any received messages received at its endpoint. Based on the received message, the header and body content data may be interpreted. Any query that may be included in the received message is extracted by the listener and recorded. In some implementations, the listener may record the queries for a platform agnostic query acceleration service analyzer, which can be triggered online or offline.

In some implementations, the listener is configured to check (determine) whether the query matches one or more of previously generated specialized models. A query is said to match one or multiple of the specialized models, if the query can be answered using the data contained in those models.

In some implementations, a match may be determined based on a logical containment check. For example, a query may be determined to match a specialized model if it at least partially meets a logical containment check, i.e., whether the model contains all the rows needed to answer a received query.

If it is determined that the query matches one or more specialized models, then the listener calls the rewriter to produce the best possible (most optimized) rewriting of the original query using a subset of the specialized models that are expected to yield the best performance.

The rewritten optimized query is then transmitted to the query processing platform. The transmission is configured per the wire protocol of the corresponding query processing platform.

The query processing platform processes the rewritten query and transmits the results to the listener of the platform agnostic query acceleration service. The listener receives the results (based on the optimized query) from the query processing platform and transmits the results to the client.

In some implementations, the results could also be streamed directly from the query processing platform (backend) to the original client/application for better performance.

In some implementations, the results could also be cached (stored) in specialized data structures associated with the platform agnostic query acceleration service for better performance. For example, if it is determined that a query is received from a client/application frequently, the corresponding results, e.g., materialized views, summaries, etc., may be stored at a data store associated with the platform agnostic query acceleration service, and when the same query is received subsequently (e.g., from a different user of the same enterprise), the results may be provided directly by retrieval from the data store instead of from the query processing platform. This saves time as well as computational resources.

The client receives the query result from the listener just as it were from the query processing platform.

If it is determined that an incoming query does not match any of the generated specialized models, then the listener performs a pass through, i.e., it transmits (forwards) the original query to the query processing platform and returns to the client the results to the query received from the query processing platform. In some implementations, results obtained from a pass through query result could also be collected or cached differently.

For example, the listener can cache the results in memory using Arrow format and postprocess them using any of the Arrow based query processing libraries (e.g., Gandiva). By choosing to not store models in the backend cloud warehouses and at the query acceleration service, the client can reduce the total round trip time (user experience is improved) as well as use less expensive infrastructure to keep the pre-computed models (total costs are reduced).

In some implementations, the listener may apply additional criteria before determining that a query matches one or more specialized models, or whether the query should be passed through directly e.g., without a rewriting of the query. For example, it may be additionally verified whether the models meet a threshold freshness criterion, or whether the models meet threshold success criteria. This may enable the platform agnostic query acceleration service to filter out from use specialized models that are stale, models that previously did not provide satisfactory results, etc.

For example, a query may be directly passed through if models are stale beyond the client's specified freshness requirements, or if the models are not expected to yield an acceptable level (degree) acceleration, etc.

During the operation of the listener, one or more metrics related to its operation may be obtained and stored. For example, metrics related to its performance (e.g., time to listen, time to rewrite, time to pass through, historical query run times, etc.) may be obtained and used to determine future actions and/or decisions.

FIG. 4B depicts an example wire protocol request received at a listener associated with a platform agnostic query acceleration service, in accordance with some implementations.

FIG. 4B depicts an example request 480 that includes a message header portion 485 with message header elements and a body content portion 490 that may include commands, queries, etc.

The request may conform to any supported wire protocol and may be received at a platform agnostic query acceleration service from a client.

The message header elements may include settings indicative of a type of encoding of the body content data, a type of message included in the body content data, etc. Example message headers include fields like the login name, server to connect to, schema and database to use when executing the query, the type of operation requested, and so on.

As depicted in FIG. 4B, example headers may include Content-Length, Content-Type, Connection-Type, User-Agent, etc.

In some implementations, the message header elements are utilized to apply suitable decoding operations to the encoded body content data to extract one or more body content data elements.

In some protocols, the message type is identified in order to interpret the body of the message. For example, the message may contain additional parameters or user preferences that specify how the listener should handle or rewrite the queries, e.g., request to bypass, parameters for freshness guarantees, etc. In some implementations, the decoding operations may be performed based on a particular endpoint where the message was received.

Figure 5:
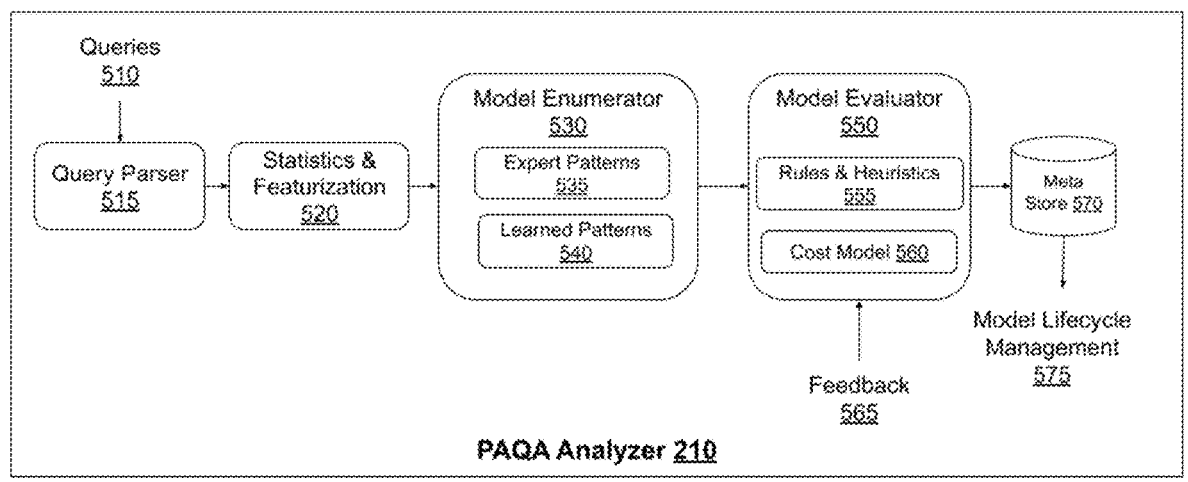
FIG. 5 depicts an example analyzer of a platform agnostic query acceleration service, in accordance with some implementations.

FIG. 5 depicts an example analyzer of a platform agnostic query acceleration service, in accordance with some implementations.

The analyzer includes a query parser 515, a module 520 to perform statistical analysis and featurization, a model enumerator 530, a model evaluator 550, and meta store 570. The model enumerator may include modules for processing expert patterns 535 and learned patterns 540.

The analyzer receives queries 510 recorded by the listener and processes them to identify specialized models (also referred to as smart models) that can enable the acceleration of queries.

In some implementations, the analyzer loads the queries directly (online mode) from the listener as soon as it is received, whereas in some other implementations, the analyzer loads queries from a workload store that were previously received at an analyzer (offline mode).

The queries (or query) are parsed into a unified query plan representation that is platform agnostic. In some implementations, all received queries are parsed. In some other implementations, queries may be partially parsed, and in some implementations, not all queries may be parsed. For example, in some implementations, only queries where there is a likelihood of query acceleration may be parsed, and other queries may be passed through the analyzer without any additional processing.

The analyzer extracts statistics and other features from the query and any of its associated metrics (e.g., runtime, bytes read, output size, etc.) either by invoking a request to the query processing platform (e.g., by transmitting the request for statistics and/or metric data) or by using historical meta data collected and stored at a data store associated with the platform agnostic query acceleration service.

The listener collects all workload metadata that is received at the listener into the meta store, which may be later utilized to extract statistics for each query. Additionally, the listener also maintains a record of the performance metrics (e.g., time taken, number of packets, etc.) of every query it sends to the backend, which may be later utilized by the analyzer. Finally, the analyzer can pull workload metadata and metrics collected by the backend cloud warehouse (query processing platform).

In some implementations, the features extracted from the query may be mapped to previously observed access patterns, e.g., access patterns associated with other business intelligence (BI) tools. Data trees may be utilized for the mapping and comparison of source and target patterns.

For example, if the query is determined to include a large number of join operations, all join based models may be enumerated.

A model enumerator lists the possible smart (specialized) models for the given query(s). The smart models can include a variety of models that can enable query acceleration. For example, the specialized models can include summaries of base tables, e.g., the types of summaries explained with respect to FIG. 3. A candidate model can be of different granularity, e.g., the model may be aggregated by milliseconds, seconds, hour, day, geography, other attributes, etc.

In some implementations, the models may include summaries where multiple columns can be summarized together, i.e., they are multi-dimensional. This is typically done by moving columns to group bys.

In some implementations, a model may include multiple base tables that are combined together, e.g., customer and account tables.

The model enumerator can use expert patterns provided to it. The enumerator can also learn patterns from past workloads.

Models may include partial computations that repeated or are commonly shared by other queries, computations that could be used to derive the results of new queries, combination of inputs and operations that remain static over time, statistical models or metrics that could be used to provide approximate answers to queries, machine learning models that may be used to provide predictive answers to queries, or summary statistics that could answer trivial aggregations of one or more tables. The enumerator identifies such patterns from each of the queries that could be codified into a model and later used to answer future queries efficiently. These patterns could be either provided by experts or could also be inferred from customer workloads using machine learning (classification or regression) or data mining (frequent itemset mining).

A model evaluator checks the effectiveness of the enumerated models and assigns a score (e.g., based on how many times it could be used, how many times it needs to be updated and its update cost, a speedup provided by the model when utilized by a query, etc.) to each candidate model. The evaluator may use rules and previously stored heuristics that are crafted by experts. The evaluator may also learn a cost model to identify the good models.

Essentially, the cost model captures the expected cost to create the model, cost to update the model, update frequency, speedup in query runtime, and the number of queries that will be using the model.

The evaluator receives feedback from past runs to discard models that were known to be performing poorly in the past, i.e., the scores of models that performed poorly are set to low levels.

Models selected by the evaluator are persisted in the meta store. A model lifecycle component operates over the models in the meta store.

The architecture of the platform agnostic query acceleration service analyzer provides several technical benefits. Since the analyzer parses input queries into a standardized query representation, it can be utilized across multiple dialects, e.g., different SQL dialects, as well as with a wide range of backend query processing platforms.

The analyzer maintains a record of runtime metrics of the queries and assigns scores to models based on the runtime metrics, and is therefore not reliant solely on cost estimates for different optimizations/accelerations that can be error prone and which are typically inaccurate.

The analyzer combines the best of expert knowledge with data learning, thus giving it a good starting point while still self-improving over time. The models produced are generalized to cover as many queries as possible with the least storage and/or update budget and with the maximum speedup, i.e., the focus is to cover a large portion of the workloads such that business intelligence (BI) dashboards of users experience an overall performance improvement.

In some implementations, the models are selected to provide BI dashboards with the highest performance improvement at the least cost.

The model evaluator is feedback driven, i.e., it takes the performance of past models into consideration and automatically weeds out poorly performing ones.

Figure 6:
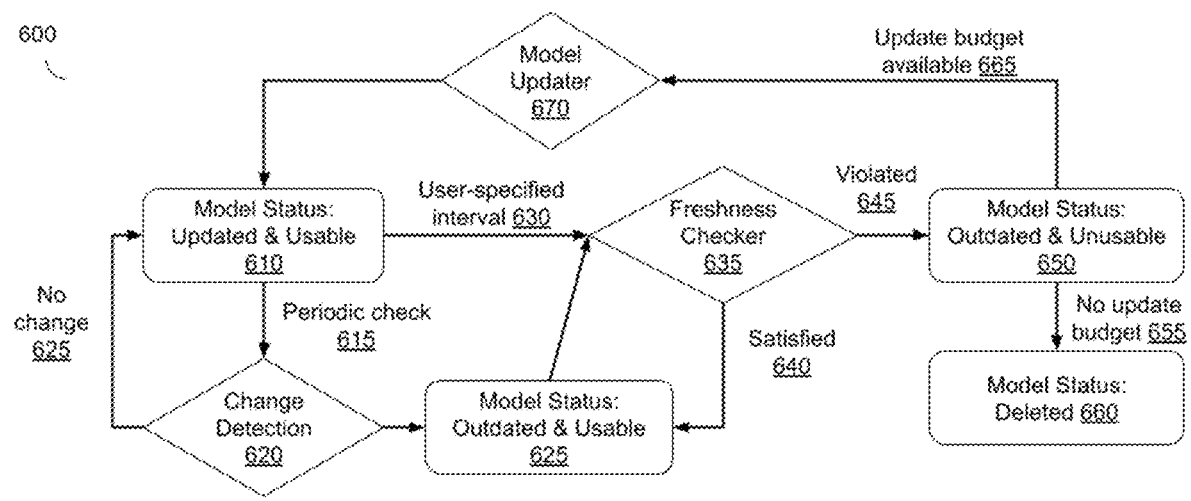
FIG. 6 depicts an example query acceleration model workflow, in accordance with some implementations.

FIG. 6 depicts an example query acceleration model lifecycle and maintenance workflow, in accordance with some implementations.

The specialized models for query acceleration, e.g., the models described with reference to FIG. 5, are maintained (updated) to ensure their freshness and accuracy. In this regard, a model lifecycle management process is implemented.

The models selected by the analyzer go through a model lifecycle manager, which automatically takes care of creating, maintaining, and purging them while adhering to the freshness requirements, an update budget, and a storage budget specified by the users.

An example workflow for model lifecycle management is described herein.

The selected model is generated (created), i.e., the corresponding computation is pre-executed, and its results stored for future queries. Multiple model creation strategies could be used, e.g., using a result cache for small models or creating a new table for better data layout over large models. At the point of generation, the model is considered to be updated and usable 610.

A change detection process 620 operates, e.g., at a predetermined frequency, or based on received event signals/triggers, and identifies changes to any of the inputs to the model; in case of a change, the corresponding model(s) will be marked 625 as out of date. Multiple change detection strategies could be employed for better efficiency, e.g., checking a result scan for small models or running additional queries for large models.

A freshness checker 635 is utilized to verify whether the model, even if outdated, meets a threshold freshness (freshness requirement). The threshold freshness may be specified by a user, e.g., an enterprise user, and may be specified on a user, user group, application, base table, or other basis. If it is determined that the freshness limit for the model is satisfied 640 (e.g., not violated), the out of date model may continue to be used 625 for query acceleration for a certain period of time.

If it is determined that the threshold freshness is not satisfied (e.g., violated or breached) 645, the out of date model may automatically be marked as unusable 650 for query acceleration.

In some implementations, a separate model update process is utilized to periodically update any out of date models. Based on a determination that one or more models are out of date, the model update process may attempt to update out of date models, upon verification that a portion of the update budget and/or storage budget is still available (655) for use. The update budgets refers to computational and storage budgets that can be utilized by the platform agnostic query acceleration service to perform pre-computations associated with corresponding models and update instances of precomputed summaries and/or materialized views.

If the update budget is exhausted (e.g., for the day) and it is determined that no update budget is available (665), then the model may not be updated. A model purge process may be utilized to delete models 660 that cannot be used anymore or that are deemed inferior to other potential models that can be created.

Users are provided with controls to adjust the freshness guarantee and the update budget at any time and the model lifecycle starts applying user specified settings for threshold freshness from that point onwards. Users are also enabled via suitable user interfaces to review, e.g., via a portal or dashboard how much the update budget has been used over time.

The model lifecycle is completely automated and managed, i.e., users do not have to worry about the tedious tasks of selecting (choosing), creating, and updating the models over time.

Users can still control the model lifecycle cost and impact using the 'freshness,' 'update budget,' and 'storage budget' parameters that are more intuitive for them to understand and specify and which align more closely with their business goal.

The low level processes, such as change detection, or model updater, may be implemented in different ways and improved over time depending on the capabilities of the underlying query processing platform. Outdated models may still be used for some time upto a freshness tolerance threshold, which the users can control, and it is very useful in reducing the update costs. Most BI dashboards are not real time alerting systems so they have tolerance for stale results, a feature of BI dashboards which is utilized (exploited) by techniques described herein.

Users can gradually increase their update budget if they want more models to be created and updated, and so it provides users with leverage for them to control the amount of query acceleration depending on an allocated budget, e.g., how much they are willing to spend for it.

Figure 7:
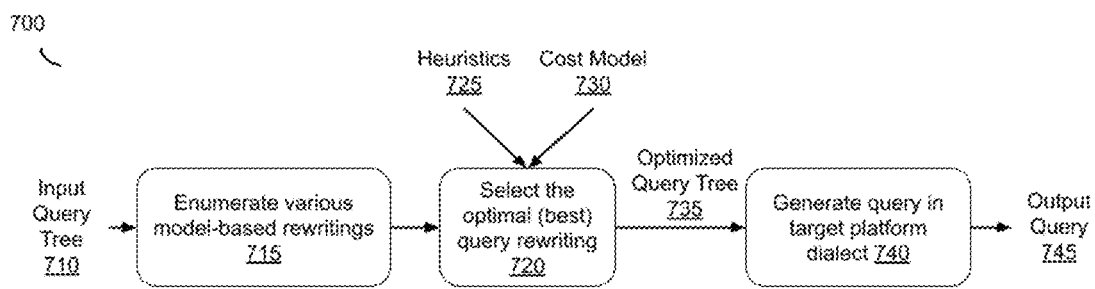
FIG. 7 depicts an example query rewriting workflow, in accordance with some implementations.

FIG. 7 depicts an example query rewriting workflow, in accordance with some implementations.

The query rewriting enables query acceleration by rewriting the query using a selected specialized model whereby the query can be processed at the query processing platform with fewer database operations, thereby improving query performance in terms of both time and resource utilization.

The rewriter rewrites the input query into optimized query using one or more specialized models that have been created and are usable, as described with reference to FIG. 6. The output of the rewriter may be an SQL statement in a dialect that is supported by a corresponding backend query processing platform.

An example workflow for the rewriter is described herein. The rewriter is configured such that it is in the live query path, i.e., it is online, and receives input queries directly from the listener. The query is transformed using one or more usable specialized models from the meta store. An optimal rewriting is selected using one or more criteria, e.g., expected cost, etc. Various model-based rewritings are enumerated (715), and then the optimal query rewriting is selected (720) based on heuristics 725 or cost models 730. An optimized query tree 735 is generated, based on which a rewritten query is generated (740) in a target dialect.

The output query 745 may then be transmitted to the listener for onward transmission to a query processing platform.

A background validator process validates the rewriting for correctness over a sample (e.g., 1%) portion of the workload. The validation sample could be increased or decreased based on the level of confidence that is desired, e.g., users can ask for a bigger validation sample for better correctness guarantees. The validation runs are further used to report the performance speedups, i.e., the ratio of runtime without and with query acceleration. The validator automates correctness checks and users can tune the validation cost they want to pay and corresponding correctness guarantee they seek.

The number of rewrites and average query latencies are also reported to the users, via a user interface. The rewriter abstracts the interface with the backend query processing platform, i.e., it performs mapping the optimized queries to the backend query dialect.

The rewriter is extensible and may use different criteria for picking the best rewriting using pluggable heuristics 725 or cost models 730.

FIG. 8 illustrates example queries, in accordance with some implementations.

A first example query, Query-1 810 is a SQL query that targets a base table ('Orders', similar to example base table 310 described with reference to FIG. 3) to determine an average sale price of items for a specified time period.

A second example query, Query-2 850 is a SQL query that targets the same base table ('Orders') to determine a count of all orders with a total price higher than an average price.

The example queries are queries that may be included in body content data included in a received message from an application at a query acceleration service, e.g., similar to body content data 490 and message 480 described with respect to FIG. 4B.

FIG. 9 illustrates example rewritten queries, in accordance with some implementations.

The example rewritten queries, Rewritten Query-1 (910) and Rewritten Query-2 (950) are queries rewritten by a query acceleration service and correspond to originally received queries 810 and 850.

In the first illustrative example, it is determined by the query acceleration service that received query-1 (810) is fully logically contained in a model that is stored in the model store. As a result, the original query is rewritten such that it only accesses (references) a summary (materialized view) that is pre-computed and stored. In this illustrative example, received query-1 (810) is rewritten by the query acceleration service to rewritten query-1 (910), which only accesses a summary (KEEBO_TEST.KEEBO.keebo_summary) and does not access a base table.

In the second illustrative example, it is determined by the query acceleration service that received query-2 (850) is partially logically contained in a model that is stored in the model store. As a result, the original query is rewritten such that it accesses a summary (materialized view) that is pre-computed and stored, as well as accesses a base table, while still providing query acceleration (one or more of time savings, cost savings, etc.). In this illustrative example, received query-2 (850) is rewritten by the query acceleration service to rewritten query-2 (950), which accesses a summary (KEEBO_TEST.KEEBO.keebo_summary) as well as a base table (Orders).

Figure 10:
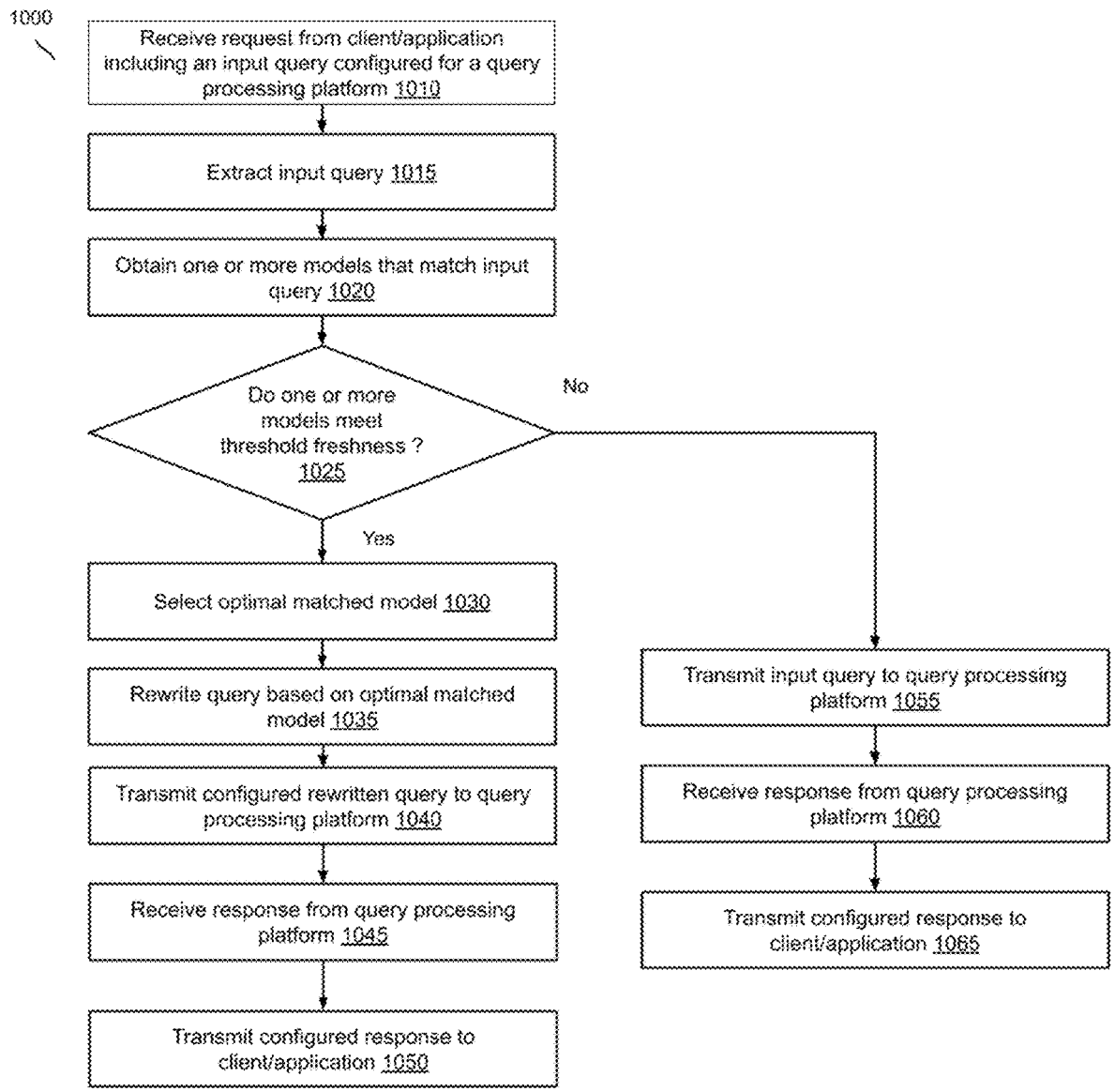
FIG. 10 depicts an example method to accelerate a query by utilizing a platform agnostic query acceleration service, in accordance with some implementations.

FIG. 10 depicts an example method to accelerate a query by utilizing a platform agnostic query acceleration service, in accordance with some implementations.

In some implementations, method 1000 can be implemented, for example, on query acceleration service system 110 described with reference to FIG. 1. In some implementations, some or all of the method 1000 can be implemented on one or more enterprise computer systems 120, on cloud computing system 130, as shown in FIG. 1, and/or on a combination of the systems. In the described examples, the implementing system includes one or more digital processors or processing circuitry ("processors"), and one or more storage devices. In some implementations, different components of one or more distributed computing systems (eg., cloud based systems), servers and/or clients can perform different blocks or other parts of the method 1000. In some examples, a first device is described as performing blocks of method 1000. Some implementations can have one or more blocks of method 1000 performed by one or more other devices (e.g., other client devices or server devices) that can send results or data to the first device.

In some implementations, the method 1000, or portions of the method, can be initiated automatically by a system. In some implementations, the implementing system is a first device. For example, the method (or portions thereof) can be periodically performed, or performed based on one or more particular events or conditions, e.g., receipt of a query from a client or application, receipt of an indication from the query processing platform, reception of performance metric data, reception of events, notifications, and/or messages from a cloud computing system, at a predetermined time, a predetermined time period having expired since the last performance of method 1000, and/or one or more other conditions or events occurring which can be specified in settings read by the method.

Processing may begin at block 1010.

At block 1010, a request configured for a query processing platform is received at a platform agnostic query acceleration service from a client/application. The platform agnostic query acceleration service is an intermediate entity different from the query processing platform.

Block 1010 may be followed by block 1015.

At block 1015, an input query is extracted from the received request. In some implementations, the input query is extracted by applying a sequence of operations. In some implementations, the sequence of operations is included in the received request.

Block 1015 may be followed by block 1020.

At block 1020, one or more query acceleration models that match the input query are obtained.

Block 1020 may be followed by block 1025.

At block 1025, it is determined whether one or more query acceleration models meet a threshold freshness associated with the input query. In some implementations, the threshold freshness may be associated with one or more of a user identifier, a user application, a user enterprise affiliation, or a target query acceleration platform associated with the input request.

At block 1025, it is determined whether one or more models meet a threshold freshness. If it is determined that one or more models meet a threshold freshness, block 1025 is followed by block 1030, else block 1025 is followed by block 1055.

At block 1055, the input query is transmitted to the query processing platform.

Block 1055 may be followed by block 1060.

At block 1060, a response is received at the platform agnostic query acceleration service from the query processing platform.

Block 1060 may be followed by block 1065.

At block 160, the response is transmitted to the client/application

At block 1030, based on a determination that one or more models do meet a threshold freshness, an optimal matched model from the one or more models is selected.

Block 1030 may be followed by block 1035.

At block 1035, the input query is rewritten based on the optimal matched model.

Block 1035 may be followed by block 1040.

At block 1040, a configured rewritten query is transmitted to the query processing platform, wherein the rewritten query is configured to include header data, and is configured to conform to a wire protocol associated with the query processing platform.

Block 1040 may be followed by block 1045.

At block 1045, a response is received from the query processing platform.

Block 1045 may be followed by block 1050.

At block 1050, the response is transmitted to the client/application associated with the request and/or input query.

Blocks 1010-1065 can be performed (or repeated) in a different order than described above and/or one or more steps can be omitted. For example, in some implementations, blocks 1025 and 1055-1065 may be omitted.

Figure 11:
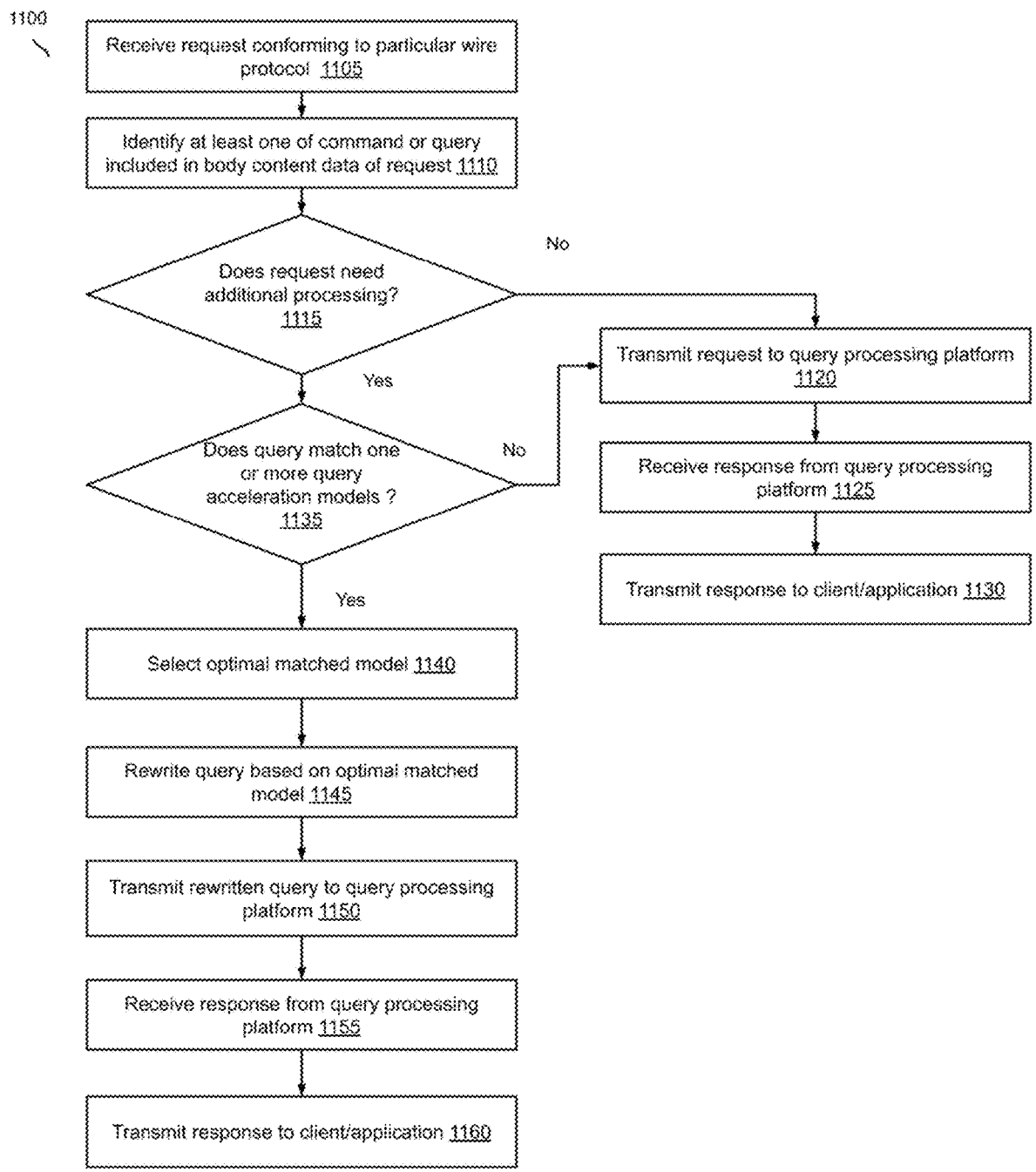
FIG. 11 depicts another example method to accelerate a query by utilizing a platform agnostic query acceleration service, in accordance with some implementations.

FIG. 11 depicts another example method to accelerate a query by utilizing a platform agnostic query acceleration service, in accordance with some implementations.

In some implementations, method 1100 can be implemented, for example, on query acceleration service system 110 described with reference to FIG. 1. In some implementations, some or all of the method 1100 can be implemented on one or more enterprise computer systems 120, on cloud computing system 130, as shown in FIG. 1, and/or on a combination of the systems. In the described examples, the implementing system includes one or more digital processors or processing circuitry ("processors"), and one or more storage devices. In some implementations, different components of one or more distributed computing systems (e.g., cloud based systems), servers and/or clients can perform different blocks or other parts of the method 1100. In some examples, a first device is described as performing blocks of method 1100. Some implementations can have one or more blocks of method 1100 performed by one or more other devices (e.g., other client devices or server devices) that can send results or data to the first device.

In some implementations, the method 1100, or portions of the method, can be initiated automatically by a system. In some implementations, the implementing system is a first device. For example, the method (or portions thereof) can be periodically performed, or performed based on one or more particular events or conditions, e.g., receipt of a query from a client or application, receipt of an indication from the query processing platform, reception of performance metric data, reception of events, notifications, and/or messages from a cloud computing system, at a predetermined time, a predetermined time period having expired since the last performance of method 1100, and/or one or more other conditions or events occurring which can be specified in settings read by the method.

Processing may begin at block 1105.

At block 1105, a request from an application may be received at a processor associated with a platform agnostic query acceleration service. In some implementations, the query acceleration service may be provided as an intermediate service that enables query processing for an application that is configured to utilize a third-party query processing platform.

In some implementations, the request conforms to a particular wire protocol of a plurality of supported wire protocols and includes header data and encoded body content data.

In some implementations, the particular wire protocol may be associated with a corresponding particular endpoint of the platform agnostic query acceleration service. For example, every unique combination pair of client/application and query processing platform may be associated with a particular and/or unique endpoint platform agnostic query acceleration service.

In some other implementations, the particular wire protocol may be identified by the platform agnostic query acceleration service based on analyzing the header data elements in the received request (message).

In some implementations, the request may include a request generated by a JDBC type 4 driver, also known as the Direct to Database Pure Java Driver, at the client/application. In some implementations, the client/application may utilize a database driver implementation that converts JDBC calls directly into a vendor-specific database protocol.

Block 1105 may be followed by block 1110.

At block 1110, the request is analyzed (decoded) to identify at least one of a query and a command included in the body content data.

For example, upon receipt of the request, the header elements in the request may be utilized to apply one or more operations to the body content data to identify one or more of a query, command, configuration statement, etc.

Block 1110 may be followed by block 1115.

At block 1115, it is determined based on the body content data whether the request is to be bypassed or whether the request includes a query to be processed.

The determination of whether a received request should be further processed may be based on one or more conditions. The conditions may include evaluation of one or more factors that may enable determination as to whether the query acceleration service can advantageously process a query that is included in the received request.

A query language is a specialized programming language for searching and changing the contents of a database. A query may involve searching (querying) the contents of a database; in some cases, modern query languages such as SQL additionally support features for interacting with the DBMS, including statements for defining and changing database schema, populating contents such as base tables of the database, searching the contents of the database, updating the contents of the database, defining integrity constraints over the database, defining stored procedures, defining authorization rules, defining triggers, etc. The data definition statements of a query language specify primitives for defining and changing the database schema, while data manipulation statements allow populating, querying, as well as updating the database.

For example, some received requests may include commands, configuration statements, specification of user roles, workload usage enquiries, etc., such that the request does not include a query and therefore without a potential for query acceleration. Some other requests may include a query, but the query may be relatively simple, e.g., with a short processing time, with limited resource utilization, etc., and may not benefit from query acceleration. In such situations, it may be beneficial to bypass query acceleration, and transmit the received message to the corresponding query processing platform.

For example, in some implementations, it may be determined whether the received request includes a query. In some implementations, it may be determined whether the received request includes a query that has a likely processing time that meets (e.g., exceeds a predetermined threshold processing time). Some queries may have short processing times and may not provide benefits from query acceleration.

In some implementations, a query may include any query that targets a base table stored in a database, e.g., a relational database, and which is a script that can be converted to executable operators and accesses one or more rows, columns, fields, tables, etc., that are included in a database. The query may be scripted to retrieve data as well as apply transformations to one or more data elements in one or more database table(s) and that returns a result.

If it is determined that the received request should be further processed by the platform agnostic query acceleration service, block 1115 may be followed by block 1135, else block 1115 may be followed by block 1120.

At block 1120, the request is transmitted to the query processing platform.

Block 1120 may be followed by block 1125.

At block 1125, a response is received from the query processing platform (in response to the request transmitted at block 1120).

In some implementations, the system may be configured such that the response is caused to be transmitted directly to the client/application.

Block 1125 may be followed by block 1130.

At block 1130, the response received from the query processing platforms transmitted from the query acceleration service to the client/application, and processing of the request (e.g., the request received at block 1105) is completed.

At block 1135, it is determined whether the received query (e.g., the query included in the received request) matches one or more query acceleration models. The one or more query acceleration models are logical representations of instances of precomputed summaries, materialized views, etc., of one or more fields/tables included in the query, that have been previously generated and stored, either at the query processing platform or, optionally, at the platform agnostic query acceleration service.

For example, some query acceleration models may include aggregates of one or more columns across a set of rows, joins of one more tables, etc. In some implementations, the one or more query acceleration models comprises a derived computation from one or more base tables, e.g., summaries of tables, materialized views of tables, joined tables, group bys, and combinations thereof.

In some implementations, the query may be converted from the dialect it was received in (e.g., a first format or language) to a common query plan representation (e.g., a second format or language, different from the first format or language), and a search of a data store associated with the platform agnostic query acceleration service may be performed in the common query plan representation (the second format or language). One or more query acceleration models (specialized models) may be selected from a data store based on the search.

In some implementations, the query is parsed and converted to a common query plan representation and one or more query acceleration models may be selected from a data store based on a search performed on the data store by utilizing the converted query.

In some implementations, the selection of one or more query acceleration models is based on a search performed by utilizing a common query plan representation of the query instead of performing the search based on the original query.

For example, an SQL query is first converted to a common query plan representation, and then a search is performed on a data store.

The common query plan representation may utilize a data tree that includes a representation of all operations with the original query. Hashes of one or more portions of the data tree may be used to compare an incoming query with one or more models that are represented by their corresponding data trees, and the model that provides the most savings may be selected as an optimal matched model.

In some implementations, additional filters may be applied prior to the selection of one or more models from a data store. For example, only query acceleration models that meet a threshold data freshness may be selected. The threshold data freshness may be associated with a particular query based on a user, user computing device, user group, originating client/application, etc. The threshold data freshness may be specified by a user via a user interface provided for the purpose. The threshold data freshness may enable a user to specify a tolerance for outdated data for dashboards/scenarios where data that meets the data freshness threshold is suitable for the use case.

In some implementations, the one or more query acceleration models meet a data freshness threshold, and the data freshness threshold associated with the query is determined based on one or more of a user group, application, and user identifier associated with the request.

In some implementations, method 1100 may further include receiving a request from a user specifying a threshold data freshness for queries; the threshold data freshness may be specified on a per warehouse basis, on a per enterprise user basis, etc. The method may further include filtering available specialized models (query acceleration models) based on the threshold data freshness prior to obtaining models for comparison, e.g., a comparison to determine a match of the query with one or more query acceleration models.

In some implementations, the threshold data freshness may be specified in terms of a time of duration of acceptable freshness, e.g., in days, hours, minutes, etc. In some implementations, the threshold data freshness may be specified in terms of an index of freshness than in turn may be mapped to a duration of time.

In some implementations, selecting the one or more query acceleration models further includes selecting the one or more query acceleration models that meet a threshold success criteria. In some implementations, only query acceleration models that meet a threshold success score may be selected from a data store. The threshold success score may be determined based on previously rewritten queries and their performance, as measured by one or more performance metrics. Filtering models based on a threshold success score may enable the generation of poor results from models that may occur due to a delayed purge of poorly performing models in cases where the model maintenance life cycle operates at a different (slower) frequency than query processing.

In some implementations, determining whether the query matches one or more query acceleration models may include determining whether the one or more query acceleration models at least partially satisfies a logical containment criterion with respect to the query.

In some implementations, the one or more query acceleration models may completely satisfy a logical containment criterion (full containment) with respect to the query. For example, in a scenario of full containment, one or more query acceleration models may include all columns and rows of data from one or more bae tables that are needed to respond (resolve/answer) to the query.

In some implementations, the one or more query acceleration models may partially satisfy a logical containment criterion with respect to the query. For example, in a scenario of partial logical containment, one or more query acceleration models may not include all columns and rows of data that are needed to respond (resolve/answer) to the query, but may still include summaries of a portion of columns and rows of data elements that are needed to respond (resolve/answer) to the query.

If it is determined that the query matches one or more query acceleration models, block 1135 may be followed by block 1140, else block 1135 may be followed by block 1120.

At block 1140, an optimal matched model is selected from the one or more query acceleration models that match the query.

Determining or selecting an optimal matched model of the one or more query acceleration models may include enumerating the one or more query acceleration models, and then determining the optimal matched model. The determination may be made based on a rule based criterion or a cost based criterion.

In some implementations, the optimal matched model may be determined based on predetermined rules. The determination may be based on a rank ordered set of operations that specifies what particular operations are preferred over operations. For example, a model that includes an aggregate operation may be selected in preference over a model that includes a join operation.

For example, in some implementations, the optimal matched model may be determined as the query acceleration model that is associated with the smallest computational cost of evaluation (execution) of the query.

In some implementations, the optimal matched model may be determined based on predetermined rules. The determination may be based on a rank ordered set of operations that specifies what particular operations are preferred over operations. For example, a model that includes an aggregate operation may be selected in preference over a model that includes a join operation.

Block 1140 may be followed by block 1145.

At block 1145, the query is rewritten based on the optimal matched model.

If it is determined that the one or more query acceleration models completely satisfies (full containment) a logical containment criterion with respect to the query, rewriting the query may include rewriting the query such that the rewritten query only accesses one or more precomputed tables that are stored at the query processing platform (or at the platform agnostic query acceleration service, for particular models where such storage is provided) and does not access a base table at the query processing platform.

If it is determined that the one or more query acceleration models partially satisfies a logical containment criterion with respect to the query, the rewriting the query may include rewriting the query such that the rewritten query accesses at least one precomputed table and accesses at least one column of a base table.

Block 1145 may be followed by block 1150.

At block 1150, the rewritten query is transmitted to the query processing platform.

Block 1150 may be followed by block 1155.

At block 1155, a response to the rewritten query or the query (in case the query acceleration is bypassed) is received at the platform agnostic query acceleration service from the query processing platform.

In some implementations, the received response may be stored (cached) in a specialized data structure associated with the platform agnostic query acceleration service. This may enable superior performance for very frequently posed queries, such that when the same query is again received at the platform agnostic query acceleration service from an application associated with the same or different user, a response to the client/application may be transmitted even without transmission of the query to the query processing platform (and receiving a corresponding response). The response may be transmitted based on retrieval of the result from the local storage associated with the platform agnostic query acceleration service itself.

Block 1155 may be followed by block 1160.

At block 1160, the response received from the query processing platform is transmitted to the client/application. The transmission is configured based on the particular wire protocol that the original request conformed to.

A separate query acceleration model maintenance process is performed to ensure the generation, updation, and other maintenance of query acceleration models.

For example, a query that does not match the one or more query acceleration models may be evaluated as a candidate for model generation. In some implementations, the model generation may include calculating a score associated with the query based on one or more processing parameters associated with the query. For example, a processing time and/or processing cost associated with the query, a frequency at which the query is received, etc., may be analyzed to determine and assign a score associated with the query.

In some implementations, based on the score meeting a threshold predetermined model generation score, a new query acceleration model may be constructed based on a data tree derived from the query. The new model may be added to the set of one or more query acceleration models, for possible enumeration and utilization if the same query is received subsequently. In some implementations, the query workload is analyzed offline to determine candidate query acceleration models.

The model maintenance process additionally performs operations to ensure that the query acceleration models are updated, since the underlying data in the base tables may undergo changes due to ingestion of fresh data, etc.

In some implementations, updates to the models may be scheduled (timed) based on a time of completion of data ingestion for base tables associated with the query acceleration model. For example, a completion time of data ingestion for tables associated with each of the one or more query acceleration models may be determined and the corresponding query acceleration model may be updated subsequent to the completion time of data ingestion for the tables. For example, for a base table where data ingestion is performed at a daily frequency, this may ensure that the daily data ingestion does not happen after a model has been updated, thereby reducing the data freshness of the model.

Since generation and maintenance of models involves utilization of compute resources at the query processing platform, e.g., for the precomputation of aggregates, summaries, etc. The updates to the models may also be based on a threshold data freshness and an update budget that is specified by a user.

For example, in some implementations, it may be determined, at a user specified interval, whether a freshness level of each model of the one or more query acceleration models meets a corresponding threshold freshness. If it is determined that the freshness level of the model does not meet the corresponding threshold freshness, it may be additionally determined whether an update budget associated with the model is available, and based on a determination that the update budget associated with the model is available, the model may be updated.

Additionally, a model purge process may be performed to delete (purge) models with low scores.

Blocks 1105-1160 can be performed (or repeated) in a different order than described above and/or one or more steps can be omitted.

Figure 12A:
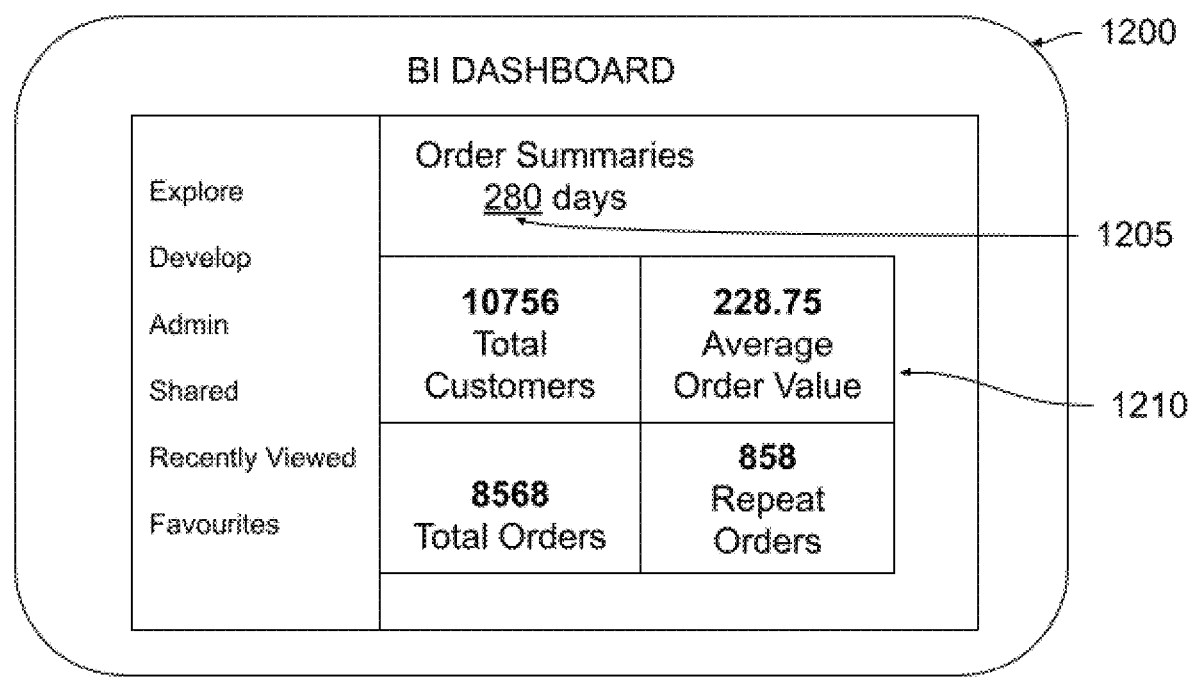
FIG. 12A depicts an example screenshot of a business intelligence (BI) dashboard that may utilize a platform agnostic query acceleration service, in accordance with some implementations.

FIG. 12A depicts an example screenshot of a business intelligence (BI) dashboard that may utilize a platform agnostic query acceleration service, in accordance with some implementations.

FIG. 12A depicts an example dashboard 1200 that may be utilized at a client/application as part of Business Intelligence operations. In this illustrative example, a user may be enabled to specify a range (e.g., 280 days) for which they wish to query the database. Example dashboard metrics 1210 include total customers, average order value, total orders, repeat orders, etc.

When a query is posed using the BI application, in a scenario where query acceleration is not utilized, a query is transmitted to a query processing platform, which may access the base tables of order data and generate the particular metrics.

In a scenario where query acceleration is utilized, the query may access summaries that have been precomputed, thereby providing results with a shorter query processing time. An advantage of query acceleration is that the BI dashboard can be refreshed faster, and the user is able to view the results faster.

Figure 12B:
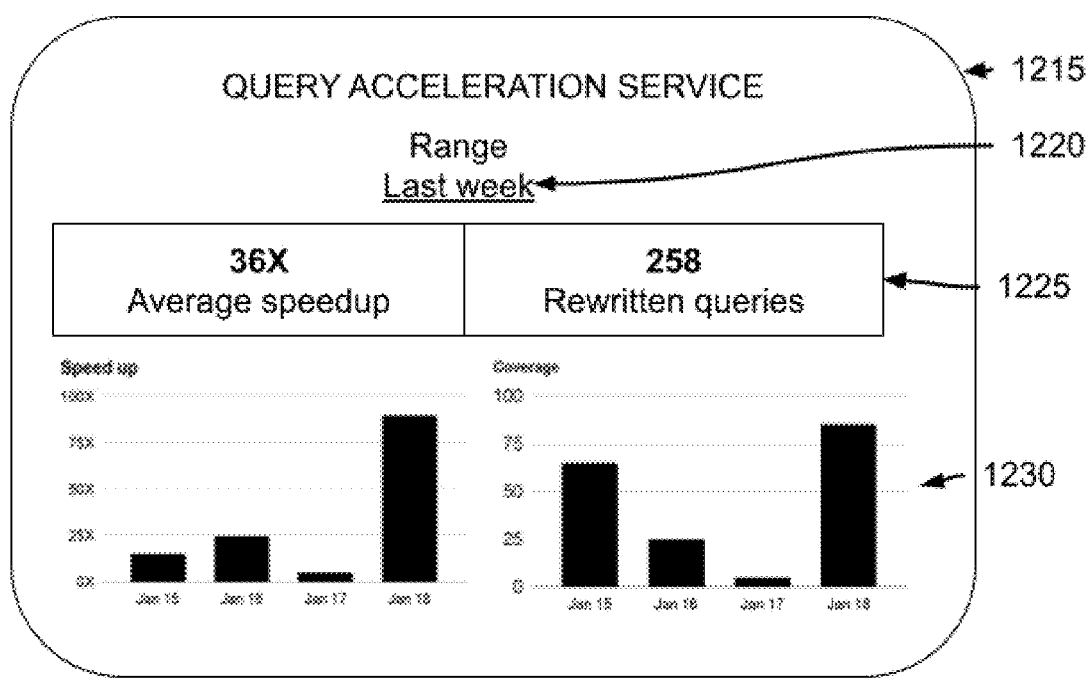
FIG. 12B depicts another example screenshot of a user interface of a platform agnostic query acceleration service.

FIG. 12B depicts an example screenshot of a user interface of a platform agnostic query acceleration service.

In this illustrative example, the screenshot depicts an example dashboard 11215 that can be utilized to display one or more performance related metrics of the platform agnostic query acceleration service. The user may select a range 1220 for which they wish to view the performance related metrics.

Average metrics 1225 as well as metrics sorted by date 1230 may be displayed and may include metrics for both speedup (e.g., how much performance was realized via query acceleration) as well as coverage (e.g., what percentage of queries experienced query acceleration).

Figure 12C:
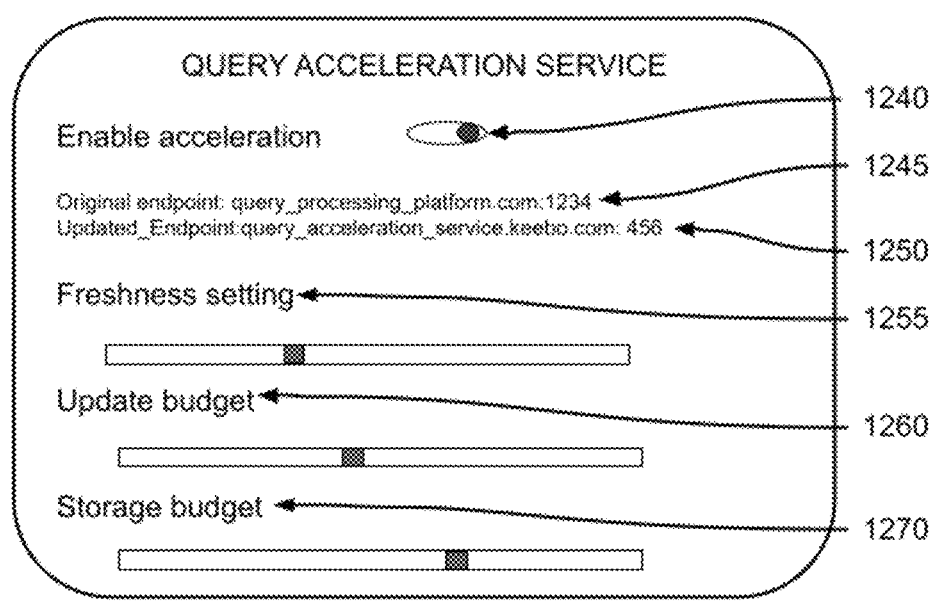
FIG. 12C depicts another example screenshot of a user interface of a platform agnostic query acceleration service.

FIG. 12C depicts another example screenshot of a user interface of a platform agnostic query acceleration service.

In this illustrative example, the screenshot depicts a dashboard that can be utilized to enable the platform agnostic query acceleration service 1240.

As described earlier, the platform agnostic query acceleration service is provided as an intermediate service, and can be seamlessly configured by merely changing an original endpoint (1245) associated with a query processing platform to an updated endpoint (1250).

A user is also provided with the ability to update a freshness setting 1255 as well as an update budget 1260 and a storage budget 1270. A user may adjust the settings to suitable levels based on their requirements, and the adjusted settings are utilized by the platform agnostic query acceleration service in its operations.

Figure 13:
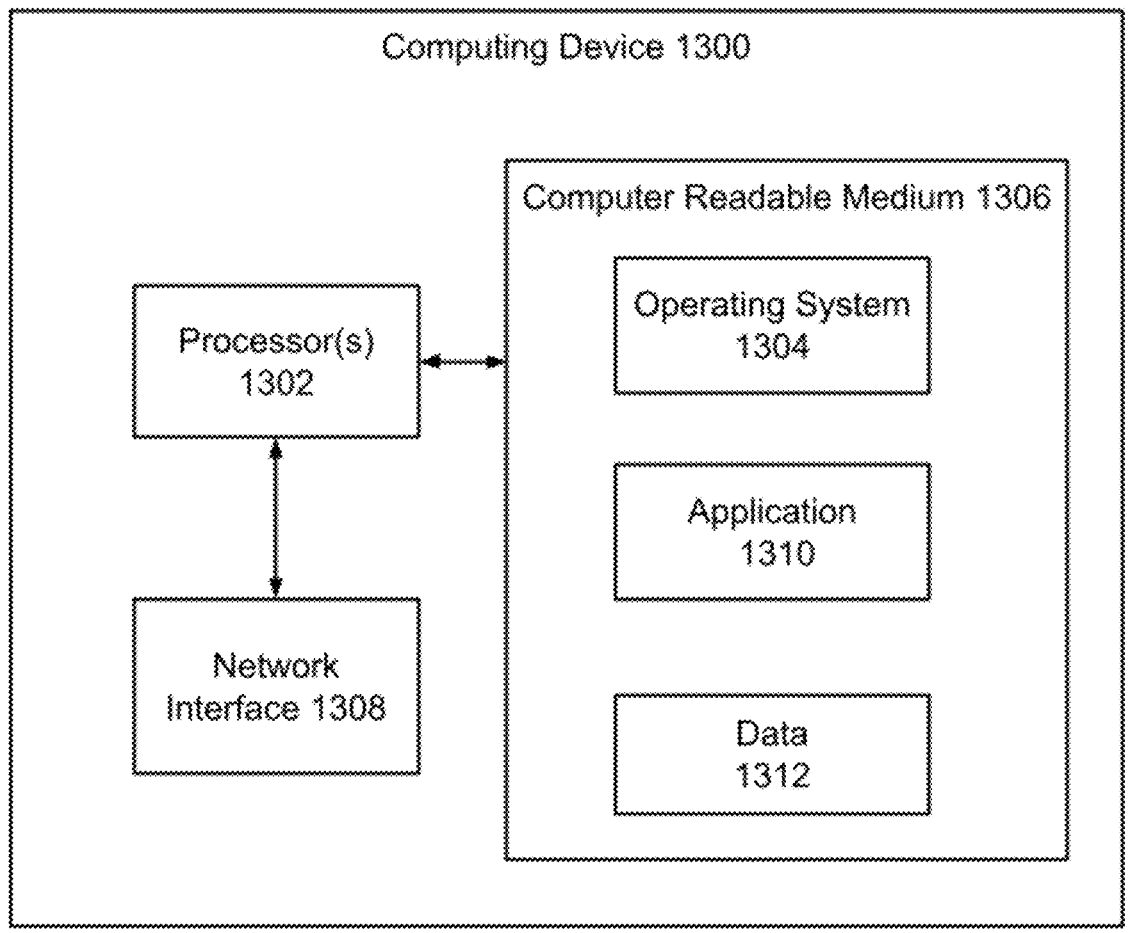
FIG. 13 depicts an example computing device, in accordance with some implementations.

FIG. 13 depicts an example computing device, in accordance with some implementations.

FIG. 13 is a block diagram of an example computing device 1300 which may be used to implement one or more features described herein. In one example, device 1300 may be used to implement a computer device (e.g. 110, 120, 130, 140, and/or 150 of FIG. 1), and perform appropriate method implementations described herein. Computing device 1300 can be any suitable computer system, server, or other electronic or hardware device. For example, the computing device 1300 can be a an compute resource on a cloud, a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 1300 includes a processor 1302, a memory or computer readable medium 1306, and network (input/output (I/O)) interface 1308.

Processor 1302 can be one or more processors and/or processing circuits to execute program code and control basic operations of the device 1300. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Computer readable medium (memory) 1306 is typically provided in device 1300 for access by the processor 1302, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 1302 and/or integrated therewith. Memory 1306 can store software operating on the device 1300 by the processor 1302, including an operating system 1304, one or more applications 1310 and application data 1312. In some implementations, application 1310 can include instructions that enable processor 1302 to perform the functions (or control the functions of) described herein, e.g., some or all of the methods described with respect to FIGS. 10 and 11.

Elements of software in memory 1306 can alternatively be stored on any other suitable storage location or computer-readable medium. In addition, memory 1306 (and/or other connected storage device(s)) can store instructions and data used in the features described herein. Memory 1306 and any other type of storage (magnetic disk, optical disk, magnetic tape, or other tangible media) can be considered "storage" or "storage devices."

A network or I/O interface can provide functions to enable interfacing the server device 1300 with other systems and devices. For example, network communication devices, storage devices, and input/output devices can communicate via the interface. In some implementations, the I/O interface can connect to interface devices including input devices (keyboard, pointing device, touchscreen, microphone, camera, scanner, etc.) and/or output devices (display device, speaker devices, printer, motor, etc.).

For ease of illustration, FIG. 13 shows one block for each of processor 1302 and memory 1306. These blocks may represent one or more processors or processing circuitries, operating systems, memories, I/O interfaces, applications, and/or software engines. In other implementations, device 1300 may not have all of the components shown and/or may have other elements including other types of elements instead of, or in addition to, those shown herein. While the processing system 130 is described as performing operations as described in some implementations herein, any suitable component or combination of components of processing system 130 or similar system, or any suitable processor or processors associated with such a system, may perform the operations described.

A user device can also implement and/or be used with features described herein. Example user devices can be computer devices including some similar components as the device 1300, e.g., processor(s) 1302, memory 1306, etc. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices, for example, can be connected to (or included in) the device 1300 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., methods 1000 and/or 1100 can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g., Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices. In another example, all computations can be performed on a distributed computing system, e.g., a cloud based computing system.

Although the description has been described with respect to particular implementations thereof, these particular implementations are merely illustrative. Concepts illustrated in the examples may be applied to other examples and implementations.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method, comprising:
    receiving, at a processor associated with a query acceleration service, a request from an application, wherein the request conforms to a particular wire protocol of a plurality of supported wire protocols, and wherein the request includes header data and body content data;
    analyzing the request to extract the body content data, wherein the analyzing comprises decoding the request;
    determining, based on the body content data whether the request is to be bypassed or whether the request includes a query to be processed;
    if it is determined that the request is to be bypassed:
        transmitting the request to a query processing platform;
        receiving a response from the query processing platform; and
        transmitting the received response to the application;
        and if it is determined that the request includes the query to be processed:
        determining whether the query matches one or more query acceleration models;
        if it is determined that the query matches the one or more query acceleration models:
            determining an optimal matched model of the one or more query acceleration models;
            rewriting the query based on the optimal matched model to generate a rewritten query; and
            transmitting the rewritten query to the query processing platform; and
        if it is determined the query does not match the one or more query acceleration models:
            transmitting the query to the query processing platform;
    receiving a response to the rewritten query or the query from the query processing platform; and
    transmitting the received response to the application, wherein the transmission is configured based on the particular wire protocol.

2. The computer-implemented method of claim 1, further comprising:
    converting the query to a common query plan representation; and
    selecting the one or more query acceleration models from a data store based on a search performed on the data store by utilizing the converted query.

3. The computer-implemented method of claim 2, wherein the one or more query acceleration models meet a data freshness threshold, and wherein the data freshness threshold associated with the query is determined based on one or more of a user group, application, and user identifier associated with the request.

4. The computer-implemented method of claim 1, wherein selecting the one or more query acceleration models further comprises selecting the one or more query acceleration models that meet a threshold success criterion.

5. The computer-implemented method of claim 1, wherein determining whether the query matches the one or more query acceleration models comprises determining whether the one or more query acceleration models at least partially satisfies a logical containment criterion with respect to the query.

6. The computer-implemented method of claim 5, wherein the one or more query acceleration models completely satisfies the logical containment criterion with respect to the query, and wherein the rewriting the query comprises rewriting the query such that the rewritten query accesses one or more precomputed tables stored at the query processing platform and does not access a base table at the query processing platform.

7. The computer-implemented method of claim 5, wherein the one or more query acceleration models partially satisfies a logical containment criterion with respect to the query, and wherein the rewriting the query comprises rewriting the query such that the rewritten query accesses at least one precomputed table and accesses at least one column of a base table at the query processing platform.

8. The computer-implemented method of claim 1, further comprising storing the received response in a specialized data structure associated with the query acceleration service.

9. The computer-implemented method of claim 1, wherein the query does not match the one or more query acceleration models and wherein the method further comprises:
    calculating a score associated with the query based on one or more processing parameters associated with the query; and
    based on the score meeting a threshold predetermined model generation score, constructing a new model based on a data tree derived from the query; and
    adding the new model to the one or more query acceleration models.

10. The computer-implemented method of claim 1, further comprising:
    determining a completion time of data ingestion for tables associated with each of the one or more query acceleration models; and
    updating the corresponding query acceleration model subsequent to the completion time of data ingestion for the tables.

11. The computer-implemented method of claim 1, wherein the one or more query acceleration models comprises a derived computation from one or more base tables, and wherein the one or more query acceleration models further comprises summaries of tables, materialized views of tables, joined tables, group bys, and combinations thereof.

12. The computer-implemented method of claim 1, wherein determining the optimal matched model comprises:

enumerating the one or more query acceleration models; and determining the optimal matched model based on a rule based criterion or a cost based criterion.

13. The computer-implemented method of claim 1, further comprising:

determining, at a user specified interval, whether a freshness level of each model of the one or more query acceleration models meets a corresponding threshold freshness;

based on a determination that the freshness level of the each model does not meet the corresponding threshold freshness, determining whether an update budget associated with the each model is available; and based on a determination that the update budget associated with the each model is available, updating the each model.

14. A non-transitory computer-readable medium comprising instructions that, responsive to execution by a processing device, causes the processing device to perform operations comprising:

receiving, at a processor associated with a query acceleration service, a request from an application, wherein the request conforms to a particular wire protocol of a plurality of supported wire protocols, and wherein the request includes header data and body content data;

analyzing the request to identify at least one of a query and a command in the body content data, wherein the analyzing comprises decoding the request;

determining, based on the body content data whether the request is to be bypassed or whether the request includes a query to be processed;

if it is determined that the request is to be bypassed:
    transmitting the request to a query processing platform;
    receiving a response from the query processing platform; and
    transmitting the received response to the application;
and if it is determined that the request includes the query to be processed:
    determining whether the query matches one or more query acceleration models;
    if it is determined that the query matches the one or more query acceleration models:
        selecting an optimal matched model of the one or more query acceleration models;
        rewriting the query based on the optimal matched model to generate a rewritten query; and
        transmitting the rewritten query to the query processing platform; and
    if it is determined the query does not match the one or more query acceleration models:
        transmitting the query to the query processing platform;
receiving a response to the rewritten query or the query from the query processing platform; and
transmitting the received response to the application, wherein the transmission is configured based on the particular wire protocol.

15. The non-transitory computer-readable medium of claim 14, wherein determining whether the query matches the one or more query acceleration models comprises determining whether the one or more query acceleration models at least partially satisfies a logical containment criterion with respect to the query.

16. The non-transitory computer-readable medium of claim 15, wherein the one or more query acceleration models completely satisfies the logical containment criterion with respect to the query, and wherein the rewriting the query comprises rewriting the query such that the rewritten query accesses one or more precomputed tables stored at the query processing platform and does not access a base table at the query processing platform.

17. The non-transitory computer-readable medium of claim 15, wherein the one or more query acceleration models partially satisfies the logical containment criterion with respect to the query, and wherein the rewriting the query comprises rewriting the query such that the rewritten query accesses at least one precomputed table and accesses at least one column of a base table.

18. A system comprising:

a memory with instructions stored thereon; and a computing device, coupled to the memory, the computing device configured to access the memory and execute the instructions, wherein the instructions cause the computing device to perform operations including:

receiving, at a processor associated with a query acceleration service, a request from an application, wherein the request conforms to a particular wire protocol of a plurality of supported wire protocols, and wherein the request includes header data and body content data;

decoding the request, using the header data to extract the body content data;

determining, based on the body content data whether the request is to be bypassed or whether the request includes a query to be processed;

if it is determined that the request is to be bypassed:
    transmitting the request to a query processing platform;
    receiving a response from the query processing platform; and
    transmitting the received response to the application;
and if it is determined that the request includes the query to be processed:
    determining whether the query matches one or more query acceleration models;
    if it is determined that the query matches the one or more query acceleration models:
        determining an optimal matched model of the one or more query acceleration models;
        rewriting the query based on the optimal matched model to generate a rewritten query; and
        transmitting the rewritten query to the query processing platform; and
    if it is determined the query does not match the one or more query acceleration models:
        transmitting the query to the query processing platform;
    receiving a response to the rewritten query or the query from the query processing platform; and
    transmitting the received response to the application, wherein the transmission is configured based on the particular wire protocol.

19. The system of claim 18, wherein determining the optimal matched model comprises:

enumerating the one or more query acceleration models; and determining the optimal matched model based on a rule based criterion or a cost based criterion.

20. The system of claim 18, wherein the one or more query acceleration models meet a data freshness threshold, and wherein the data freshness threshold associated with the query is determined based on one or more of a user group, application, and user identifier associated with the request.

\* \* \* \* \*